United States Patent
Cho et al.

(10) Patent No.: US 10,545,237 B2
(45) Date of Patent: Jan. 28, 2020

(54) METHOD AND DEVICE FOR ACQUIRING DISTANCE INFORMATION

(71) Applicant: SAMSUNG ELECTRONICS CO., LTD., Suwon-si (KR)

(72) Inventors: Yongchul Cho, Suwon-si (KR); Namseop Kwon, Suwon-si (KR); Yonghwa Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 334 days.

(21) Appl. No.: 15/472,804

(22) Filed: Mar. 29, 2017

(65) Prior Publication Data
US 2018/0052231 A1 Feb. 22, 2018

(30) Foreign Application Priority Data

Aug. 22, 2016 (KR) .................. 10-2016-0106167

(51) Int. Cl.
*G01S 17/08* (2006.01)
*G01S 7/481* (2006.01)

(52) U.S. Cl.
CPC ............ *G01S 17/08* (2013.01); *G01S 7/4815* (2013.01); *G01S 7/4816* (2013.01)

(58) Field of Classification Search
CPC ........ G01S 17/08; G01S 17/36; G01S 7/4815; G01S 7/4915
See application file for complete search history.

(56) References Cited

U.S. PATENT DOCUMENTS

| 4,935,616 A | 6/1990 | Scott |
| 5,081,530 A | 1/1992 | Medina |
| 6,057,909 A | 5/2000 | Yahav et al. |
| 6,088,086 A | 7/2000 | Muguira et al. |
| 6,100,517 A | 8/2000 | Yahav et al. |
| 6,118,946 A | 9/2000 | Ray et al. |

(Continued)

FOREIGN PATENT DOCUMENTS

| JP | 201617799 A | 2/2016 |
| KR | 1020100075366 A | 7/2010 |

(Continued)

OTHER PUBLICATIONS

Hibino et al: "Phase shifting for nonsinusoidal waveforms with phase-shift errors" vol. 12, No. 4, Apr. 1995, J. Opt. Soc. Am. A, pp. 761-768 (8 pages total).

(Continued)

*Primary Examiner* — Eric L Bolda
(74) *Attorney, Agent, or Firm* — Sughrue Mion, PLLC

(57) ABSTRACT

A method of acquiring distance information about a subject is provided. The method may include: determining a number of a plurality of lights to be emitted to the subject; emitting the determined number of the plurality of lights to the subject; modulating the plurality of lights returning from the subject; determining a weight based on at least one of the plurality of lights emitted to the subject and an emission order of the plurality of lights; and acquiring distance information about the subject by applying the weight to each of the modulated plurality of lights. According to the method, an error is efficiently reduced based on the number of the plurality of lights projected onto the subject.

20 Claims, 33 Drawing Sheets

(56) References Cited

U.S. PATENT DOCUMENTS

| | | | |
|---|---|---|---|
| 6,331,911 | B1 | 12/2001 | Manassen et al. |
| 6,794,628 | B2 | 9/2004 | Yahav et al. |
| 6,856,355 | B1 | 2/2005 | Ray et al. |
| 7,095,487 | B2 | 8/2006 | Gonzalez-Banos et al. |
| 7,230,685 | B2 | 6/2007 | Suzuki et al. |
| 8,194,303 | B2 | 6/2012 | Park et al. |
| 8,289,606 | B2 | 10/2012 | Park et al. |
| 8,432,599 | B2 | 4/2013 | Cho et al. |
| 8,436,370 | B2 | 5/2013 | Park et al. |
| 8,492,863 | B2 | 7/2013 | Cho et al. |
| 8,587,771 | B2 | 11/2013 | Xu et al. |
| 8,599,464 | B2 | 12/2013 | Park |
| 8,611,610 | B2 | 12/2013 | Park et al. |
| 8,619,354 | B2 | 12/2013 | Park et al. |
| 8,629,976 | B2 | 1/2014 | Hui et al. |
| 8,675,272 | B2 | 3/2014 | Cho et al. |
| 8,902,411 | B2 | 12/2014 | Park et al. |
| 8,953,238 | B2 | 2/2015 | Kim et al. |
| 9,123,164 | B2 | 9/2015 | Park et al. |
| 9,151,711 | B2 | 10/2015 | Cho et al. |
| 9,310,488 | B2 | 4/2016 | Park et al. |
| 9,547,186 | B2 | 1/2017 | Han et al. |
| 2012/0162197 | A1* | 6/2012 | Park ........................ G01S 17/89 345/419 |
| 2012/0300038 | A1 | 11/2012 | You et al. |
| 2014/0300701 | A1 | 10/2014 | Park et al. |
| 2015/0153628 | A1 | 6/2015 | Cho et al. |
| 2016/0065942 | A1 | 3/2016 | Park |
| 2016/0198147 | A1 | 7/2016 | Waligorski et al. |
| 2017/0184722 | A1 | 6/2017 | Park et al. |

FOREIGN PATENT DOCUMENTS

| | | |
|---|---|---|
| KR | 1020100080092 A | 7/2010 |
| KR | 1020100084018 A | 7/2010 |
| KR | 1020100084842 A | 7/2010 |
| KR | 1020100130782 A | 12/2010 |
| KR | 1020100135548 A | 12/2010 |
| KR | 1020100138147 A | 12/2010 |
| KR | 1020110081649 A | 7/2011 |
| KR | 1020110085785 A | 7/2011 |
| KR | 1020110086364 A | 7/2011 |
| KR | 1020120030196 A | 3/2012 |
| KR | 1020120061379 A | 6/2012 |
| KR | 1020120069406 A | 6/2012 |
| KR | 1020120071970 A | 7/2012 |
| KR | 1020120075182 A | 7/2012 |
| KR | 1020120077417 A | 7/2012 |
| KR | 1020120130937 A | 12/2012 |
| KR | 1020130091194 A | 8/2013 |
| KR | 1020140121710 A | 10/2014 |
| KR | 1020150007192 A | 1/2015 |
| KR | 1020160026189 A | 3/2016 |
| KR | 10-2017-0076477 A | 7/2017 |

OTHER PUBLICATIONS

Seungkyu Lee: "Time-of-Flight Depth Camera Motion Blur Detection and Deblurring", IEEE Signal Processing Letters, vol. 21, No. 6, Jun. 2014, pp. 663-666 (4 pages total).

Benjamin Mark Moffat Drayton: "Algorithm and design improvements for indirect time of flight range imaging cameras", 2013, (236 pages total).

Lottner et al: "Movement Artefacts in Range Images of Time-of-Flight Cameras", IEEE, Aug. 20, 2007, (4 pages total).

Hoegg et al: "Real-Time Motion Artifact Compensation for PMD-ToF Images", Time-of Flight and Depth Imaging, 2013, pp. 273-288, Springer Berlin Heidelberg, (16 pages total).

Communication dated Jan. 23, 2018, issued by the European Patent Office in counterpart European Application No. 17180091.5.

* cited by examiner

Ω : Solid angle subtended by lens
δω : Solid angle subtended by patch δA (or δA')

FIG. 8
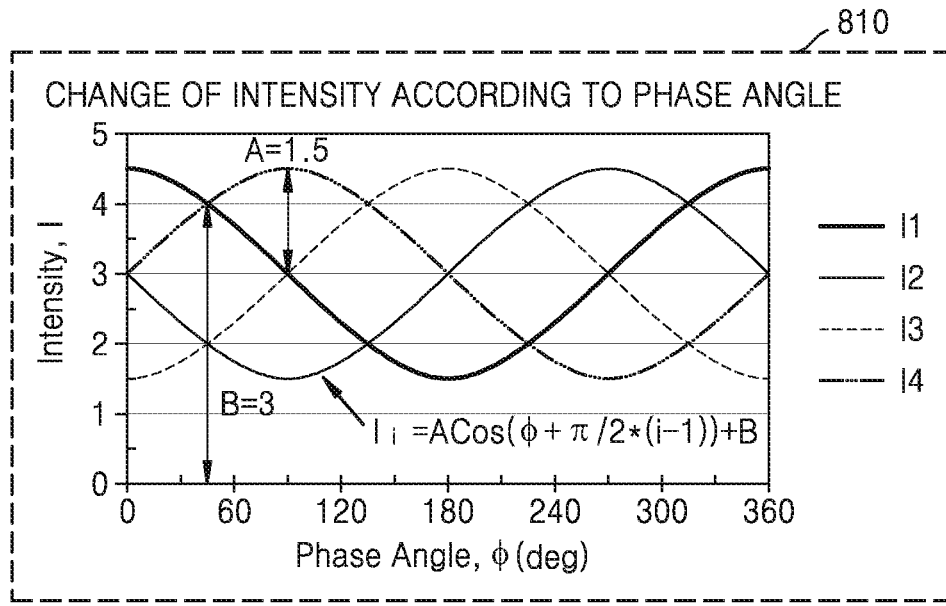
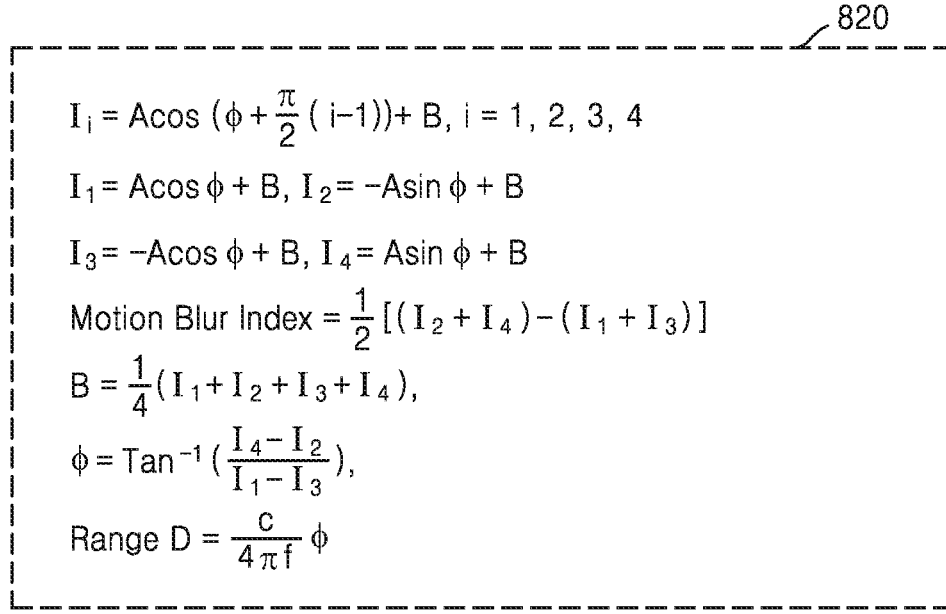
$I_i = A\cos(\phi + \frac{\pi}{2}(i-1)) + B$, $i = 1, 2, 3, 4$
$I_1 = A\cos\phi + B$, $I_2 = -A\sin\phi + B$
$I_3 = -A\cos\phi + B$, $I_4 = A\sin\phi + B$
Motion Blur Index $= \frac{1}{2}[(I_2 + I_4) - (I_1 + I_3)]$
$B = \frac{1}{4}(I_1 + I_2 + I_3 + I_4)$,
$\phi = \tan^{-1}(\frac{I_4 - I_2}{I_1 - I_3})$,
Range $D = \frac{c}{4\pi f}\phi$ FIG. 14
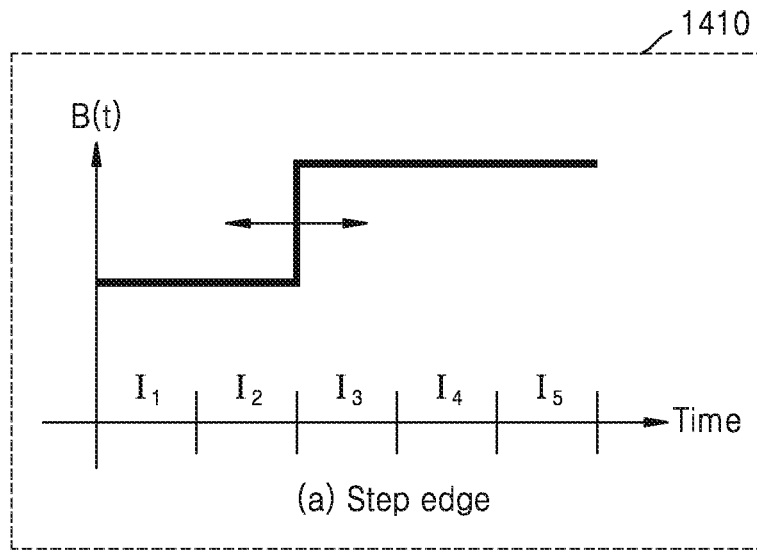
(a) Step edge
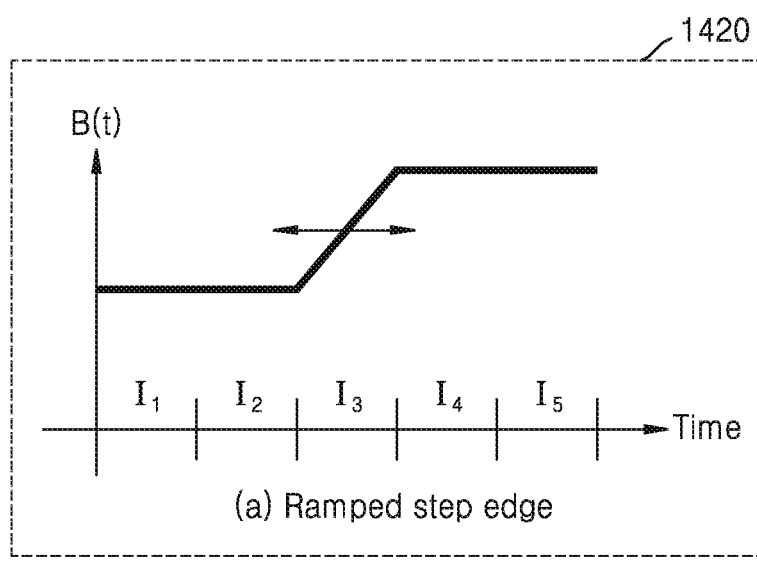
(a) Ramped step edge
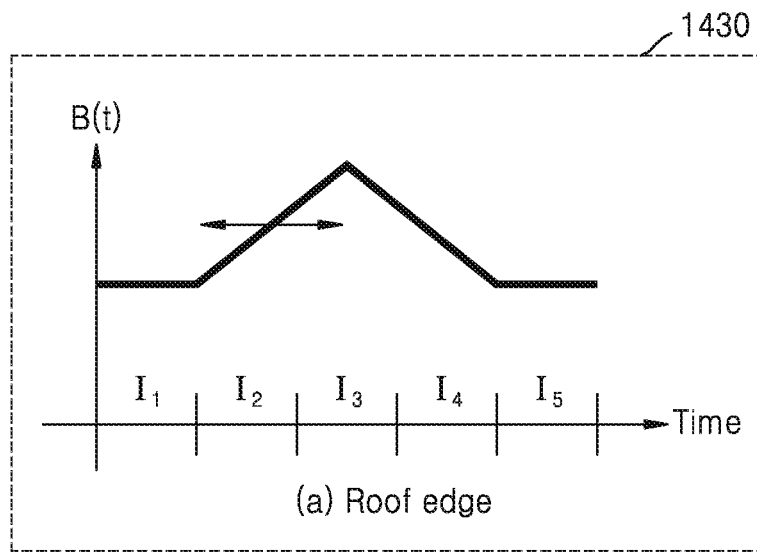
(a) Roof edge 0 − 90° × 6 Frames 0 – 90° × 7 Frames

FIG. 19
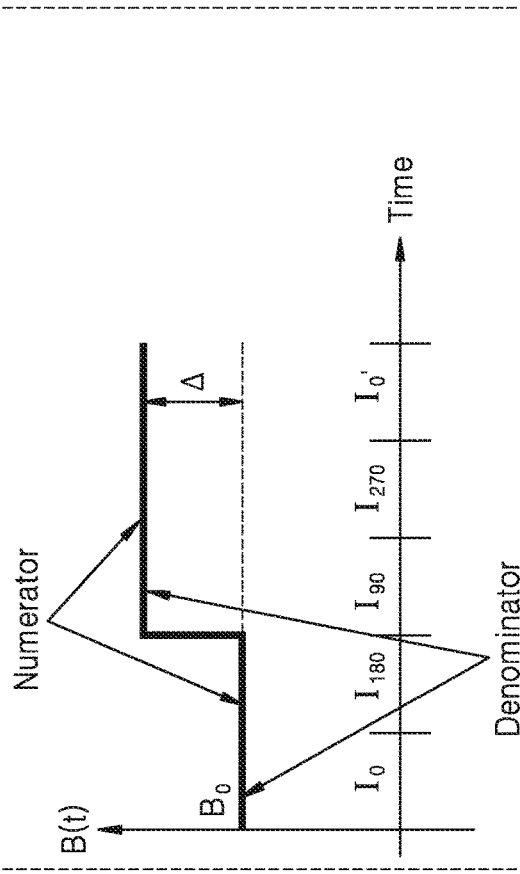
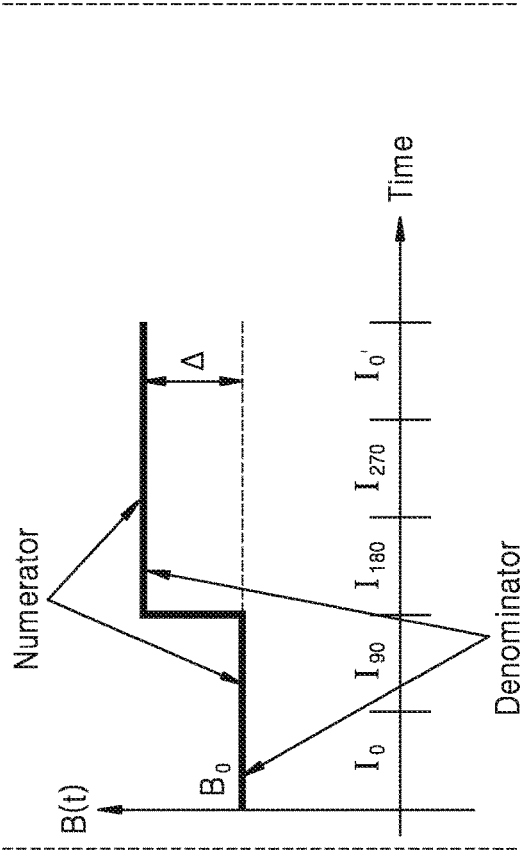

0–180° × 6 Frames

FIG. 21
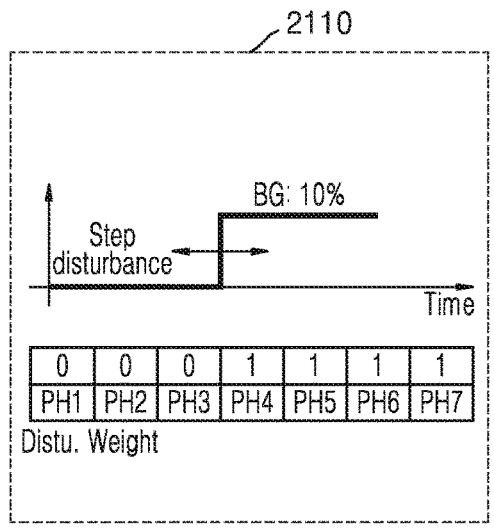
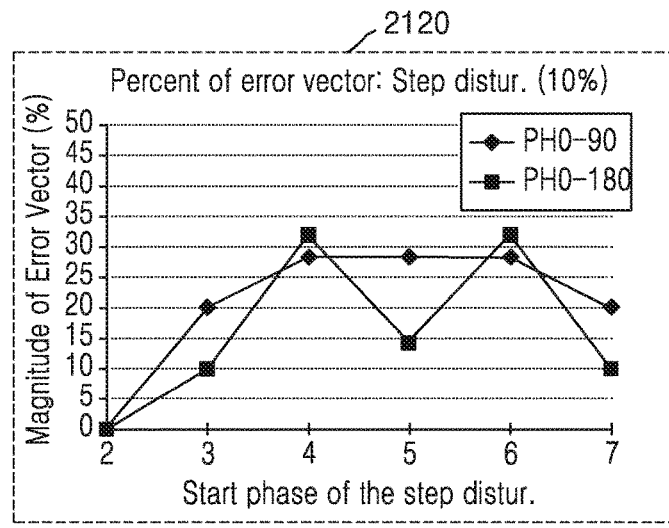
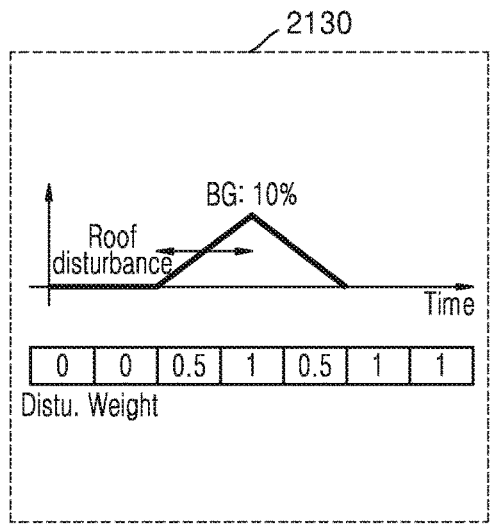
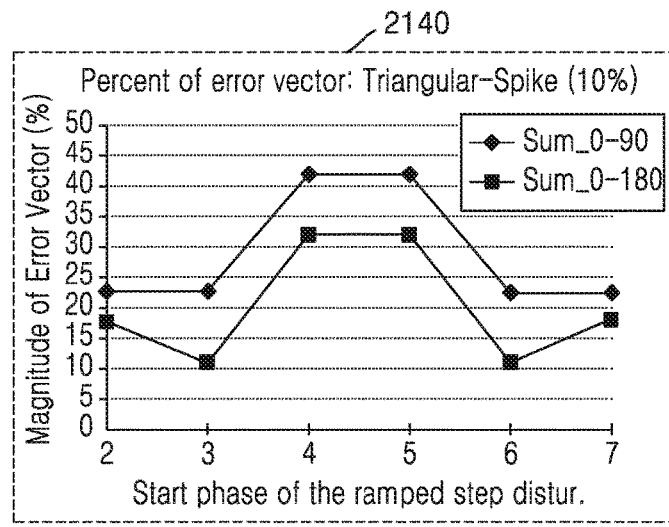
2150
$0 - 90$, PH 61:
$$\text{Tan } \phi = \frac{\text{Num}}{\text{Deno}} = \frac{-2/_2 + 4/_4 - 2/_6}{-2/_3 + 4/_5 - 2/_7}$$
$0 - 180$, PH 61:
$$\text{Tan } \phi = \frac{\text{Num}}{\text{Deno}} = \frac{3/_3 - 4/_4 + 7/_7}{-/_2 + 4/_5 - 3/_6}$$

0 − 180° × 8 Frames $$MBI_8 = \frac{1}{8} [(I_2 + 3I_4 + 3I_6 + I_8)$$
$$- (I_1 + 3I_3 + 3I_5 + I_7)] + (3\Delta - 3\Delta) + (19a - 12a)$$

$$\phi = \tan^{-1}(\frac{-I_2 + 3I_4 - 3I_6 + I_8 + 0}{-I_1 - 3I_3 + 3I_5 - I_7 + 0})$$

0-90° × 8 Frames

FIG. 27

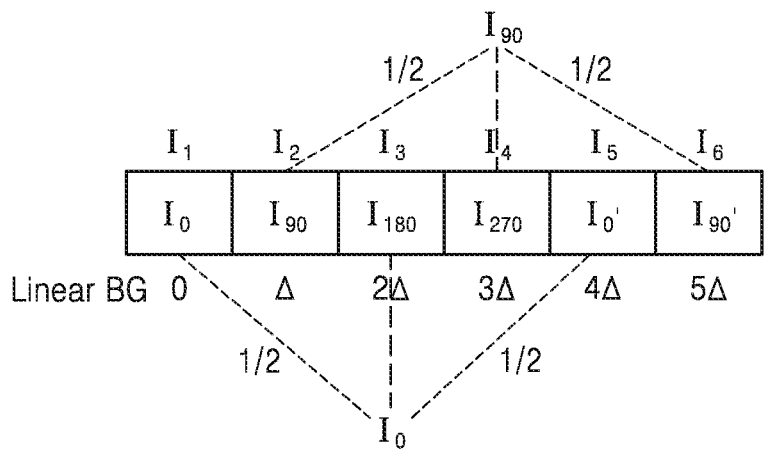

$$MBI_6 = \frac{1}{4}[(I_2 + 2I_4 + I_6) - (I_1 + 2I_3 + I_5)] + (3\Delta - 2\Delta)$$

$$(\phi)_6 : \frac{-I_2 + 2I_4 - I_6}{I_2 - 2I_3 + I_5} = \frac{4(A_0 + 3\alpha)\sin\phi + 0}{4(A_0 + 2\alpha)\cos\phi + 0} = \frac{A_0 + 3\alpha}{A_0 + 2\alpha}\tan\phi$$

$$\phi_6 = \tan^{-1}\left(\frac{A_0 + 2\alpha}{A_0 + 3\alpha} \cdot \frac{-I_2 + 2I_4 - I_6}{I_2 - 2I_3 + I_5}\right)$$

---

$I_i = A_i \cos(\phi + \frac{\pi}{2}(i-1)) + B_i$, 1, 2, 3, 4, 5, 6, 7

$I_1 = A_0 \cos\phi + B_0$, $I_2 = -(A_0 + \alpha)\sin\phi + (B_0 + \Delta)$ $I_3 = -(A_0 + 2\alpha)\cos\phi + (B_0 + 2\Delta)$, $I_4 = (A_0 + 3\alpha)\sin\phi + (B_0 + 3\Delta)$ $I_5 = (A_0 + 4\alpha)\cos\phi + (B_0 + 4\Delta)$ $I_6 = -(A_0 + 5\alpha)\sin\phi + (B_0 + 5\Delta)$ $I_7 = -(A_0 + 6\alpha)\cos\phi + (B_0 + 6\Delta)$ $$MBI_7 = \frac{1}{8}[(2I_2 + 4I_4 + 2I_6) - (I_1 + 3I_3 + 3I_5 + I_7)] + (3\Delta - 3\Delta)$$

$$(\phi)_7 : \frac{2(-I_2 + 2I_4 - I_6)}{I_1 - 3I_3 + 3I_5 - I_7} = \frac{8(A_0 + 3\alpha)\sin\phi + 0}{8(A_0 + 3\alpha)\cos\phi + 0} = \tan\phi$$

$$\phi_7 = \tan^{-1}\left(\frac{2(-I_2 + 2I_4 - I_6)}{I_1 - 3I_3 + 3I_5 - I_7}\right)$$

FIG. 29

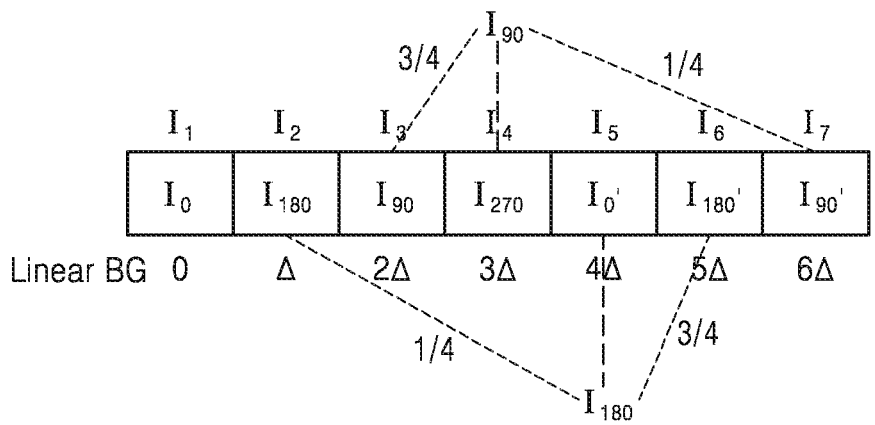

$$MBI_6 = \frac{1}{8}[(3I_3 + 4I_4 + I_7) - (I_2 + 4I_5 + 3I_6)] + (3\Delta - 4\Delta)$$

$$(\phi)_6 : \frac{-3I_2 + 4I_4 - I_7}{-I_2 + 4I_5 - 3I_6} = \frac{8(A_0 + 3\alpha)\sin\phi + 0}{8(A_0 + 4\alpha)\cos\phi + 0} = \frac{A_0 + 3\alpha}{A_0 + 4\alpha}\tan\phi$$

$$\phi_6 = \tan^{-1}\left(\frac{A_0 + 4\alpha}{A_0 + 3\alpha} \cdot \frac{-3I_2 + 4I_4 - I_7}{-I_2 + 4I_5 - 3I_6}\right)$$

$I_1 = I_0 = A_0\cos\phi + B_0$ $I_2 = I_{180} = -(A_0 + \alpha)\cos\phi + (B_0 + \Delta)$ $I_3 = I_{90} = -(A_0 + 2\alpha)\sin\phi + (B_0 + 2\Delta)$ $I_4 = I_{270} = (A_0 + 3\alpha)\sin\phi + (B_0 + 3\Delta)$ $I_5 = I_0 = (A_0 + 4\alpha)\cos\phi + (B_0 + 4\Delta)$ $I_6 = I_{180} = -(A_0 + 5\alpha)\cos\phi + (B_0 + 5\Delta)$ $I_7 = I_{90} = -(A_0 + 6\alpha)\sin\phi + (B_0 + 6\Delta)$ $I_8 = I_{270} = (A_0 + 7\alpha)\sin\phi + (B_0 + 7\Delta)$ $I_9 = I_0 = (A_0 + 8\alpha)\cos\phi + (B_0 + 8\Delta)$

FIG. 31

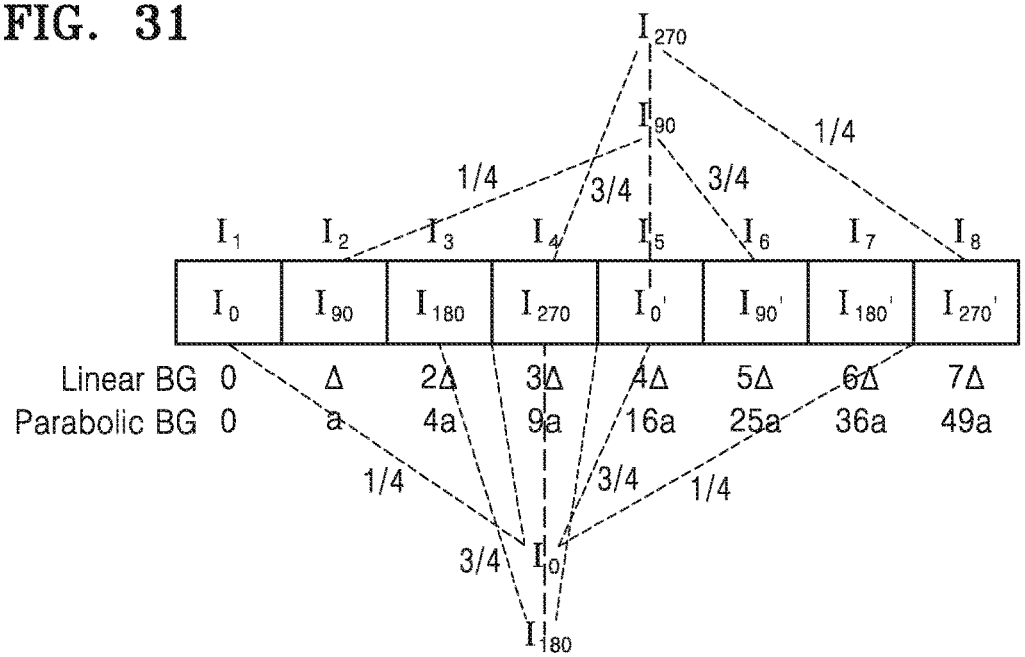

$$MBI_8 = \frac{1}{8}[(I_2 + 3I_4 + 3I_6 + I_8) - (I_2 + 3I_3 + 3I_5 + I_7)]$$
$$+ (4\Delta - 3\Delta) + (19a - 12a)$$

$$(\phi)_8 : \frac{-I_2 + 3I_4 - 3I_6 - I_8}{I_1 - 3I_3 - 3I_5 - I_7} = \frac{8(A_0 + 4\alpha + 19\beta)\sin\phi + 0}{8(A_0 + 3\alpha + 12\beta)\cos\phi + 0}$$

$$\phi_8 = \tan^{-1}\left(\frac{A_0 + 3\alpha + 12\beta}{A_0 + 4\alpha + 19\beta} \cdot \frac{-I_2 + 3I_4 - 3I_6 - I_8}{I_1 - 3I_3 - 3I_5 - I_7}\right)$$

$$I_i = A_i \cos\left(\phi + \frac{\pi}{2}(i-1)\right) + B_i, \ 1, 2, 3, 4, 5, 6, 7$$

$$I_1 = A_0 \cos\phi + B_0,$$

$$I_2 = -(A_0 + \alpha + \beta)\sin\phi + (B_0 + \Delta + \alpha)$$

$$I_3 = -(A_0 + 2\alpha + 4\beta)\cos\phi + (B_0 + 2\Delta + 4\alpha),$$

$$I_4 = (A_0 + 3\alpha + 9\beta)\sin\phi + (B_0 + 3\Delta + 9\alpha)$$

$$I_5 = (A_0 + 4\alpha + 16\beta)\cos\phi + (B_0 + 4\Delta + 16\alpha)$$

$$I_6 = -(A_0 + 5\alpha + 25\beta)\sin\phi + (B_0 + 5\Delta + 25\alpha)$$

$$I_7 = -(A_0 + 6\alpha + 35\beta)\cos\phi + (B_0 + 6\Delta + 36\alpha)$$

$$I_8 = (A_0 + 7\alpha + 49\beta)\sin\phi + (B_0 + 7\Delta + 49\alpha)$$

FIG. 32

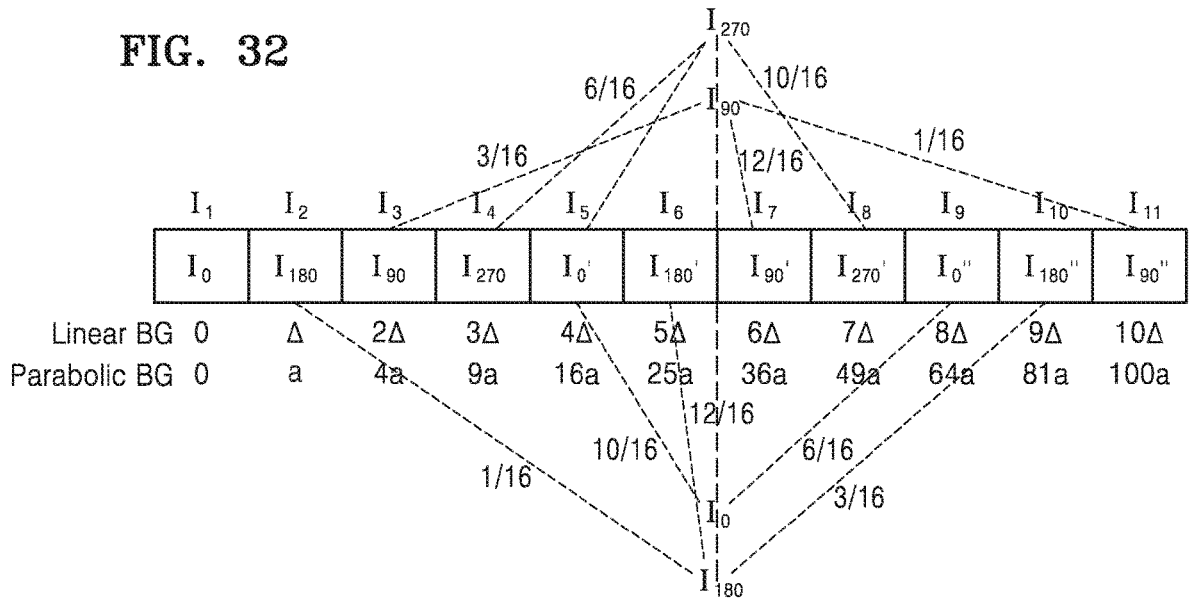

$$MBI_{10} = \frac{1}{32}[(3I_3 + 6I_4 + 12I_7 + 10I_8 + I_{11})$$
$$- (I_2 + 10I_5 + 12I_6 + 6I_9 + 3I_{10})]$$
$$+ (5.5\Delta - 5.5\Delta) + (34a - 34a)$$

$$(\phi)_{10} : \frac{-3I_3 + 6I_4 - 12I_7 + 10I_8 - I_{11}}{-I_2 + 10I_5 - 12I_6 + 6I_9 - 3I_{10}} = \frac{16(A_0 + 11\alpha + 68\beta)\sin\phi + 0}{16(A_0 + 11\alpha + 68\beta)\cos\phi + 0}$$

$$\phi_{10} = \tan^{-1}\left(\frac{-3I_3 + 6I_4 - 12I_7 + 10I_8 - I_{11}}{-I_2 + 10I_5 - 12I_6 + 6I_9 - 3I_{10}}\right)$$

$I_1 = I_0 = A_0 \cos\phi + B_0$
$I_2 = I_{180} = -(A_0 + \alpha + \beta)\cos\phi + (B_0 + \Delta + \alpha)$
$I_3 = I_{90} = -(A_0 + 2\alpha + 4\beta)\sin\phi + (B_0 + 2\Delta + 4\alpha)$
$I_4 = I_{270} = (A_0 + 3\alpha + 9\beta)\sin\phi + (B_0 + 3\Delta + 9\alpha)$
$I_5 = I_0 = (A_0 + 4\alpha + 16\beta)\cos\phi + (B_0 + 4\Delta + 16\alpha)$
$I_6 = I_{180} = -(A_0 + 5\alpha + 25\beta)\cos\phi + (B_0 + 5\Delta + 25\alpha)$
$I_7 = I_{90} = -(A_0 + 6\alpha + 36\beta)\sin\phi + (B_0 + 6\Delta + 36\alpha)$
$I_8 = I_{270} = (A_0 + 7\alpha + 49\beta)\sin\phi + (B_0 + 7\Delta + 49\alpha)$
$I_9 = I_0 = (A_0 + 8\alpha + 64\beta)\cos\phi + (B_0 + 8\Delta + 64\alpha)$
$I_{10} = I_{180} = -(A_0 + 9\alpha + 81\beta)\cos\phi + (B_0 + 9\Delta + 81\alpha)$
$I_{11} = I_{90} = -(A_0 + 10\alpha + 100\beta)\sin\phi + (B_0 + 10\Delta + 100\alpha)$

METHOD AND DEVICE FOR ACQUIRING DISTANCE INFORMATION

CROSS-REFERENCE TO RELATED APPLICATION

This application claims priority from Korean Patent Application No. 10-2016-0106167, filed on Aug. 22, 2016 in the Korean Intellectual Property Office, the disclosure of which is incorporated herein in by reference its entirety.

BACKGROUND

1. Field

Apparatuses and methods consistent with exemplary embodiments relate to acquiring distance information, and more particularly to acquiring a three-dimensional (3D) image to obtain the distance information.

2. Description of the Related Art

Recently, the importance of three-dimensional (3D) content has been magnified together with development and increasing demands of a 3D display apparatus capable of displaying an image having depth. In this regard, a 3D image acquiring apparatus, such as a 3D camera, for a general user to personally manufacture 3D content is being studied. Such a 3D camera may obtain depth information together with existing 2D color image information through a one-time image capture.

Depth information about a distance between surfaces of a subject and a 3D camera may be obtained by using a binocular stereo vision method using two cameras or a triangulation using a structure light and a camera. However, when such methods are used, accuracy of the depth information rapidly decreases when the distance increases and it is difficult to obtain precise depth information since the methods depend upon a surface state of the subject.

In this regard, time-of-flight (TOF) has been introduced. TOF is a method of emitting a light onto a subject and then measuring a time it takes for the light to be reflected at the subject and received by a light-receiving unit. According to TOF, a series of light processing operations are performed to acquire depth information. For example, a light having a certain wavelength (e.g., a near-infrared ray of 850 nm) is projected onto a subject by using an illumination optical system including a light-emitting diode (LED) or a laser diode (LD), the light reflected from the subject and having the same wavelength is received by a light-receiving unit, and then the received light is modulated by using a modulator having a known gain waveform. Various TOFs may be determined according to such a series of light processing operations.

SUMMARY

One or more exemplary embodiments provide a method of acquiring distance information, which is capable of efficiently reducing an error by controlling an emitting light, when a device acquires distance information with respect to a subject.

According to an aspect of an exemplary embodiment, there is provided a method of acquiring information about a subject including: determining a number of a plurality of lights to be emitted to the subject; emitting the determined number of the plurality of lights to the subject; modulating the plurality of lights returning from the subject; determining a weight based on at least one of the plurality of lights emitted to the subject and an emission order of the plurality of lights; and acquiring distance information about the subject by applying the weight to each of the modulated plurality of lights.

The determining the number of the plurality of lights may include determining the number of the plurality of lights to be one of 6 to 10 based on at least one of a type of noise to be filtered, the emission order, and an allowable error range.

The type of noise may include at least one of discontinuous noise generated irrespective of a lapse of time, linear function noise that linearly changes with the lapse of time, and quadratic function noise that changes in a form of a quadratic function with the lapse of time.

The acquiring the distance information may include: determining, from among a plurality of weight sets, a weight set indicating a weight corresponding to each of the modulated plurality of lights, according to at least one of the plurality of lights emitted to the subject and the emission order; and acquiring the distance information about the subject by applying the weight indicated by the determined weight set to each of the modulated plurality of lights.

The acquiring the distance information about the subject by applying the weight indicated by the determined weight set to each of the modulated plurality of lights may include: acquiring at least one of a phase difference according to time-of-flight (TOF) and a motion blur index (MBI) by applying the weight indicated by the determined weight set to each of the modulated plurality of lights; and acquiring the distance information about the subject based on the at least one of the phase and the MBI.

One of the plurality of lights emitted to the subject is one of a plurality of periodic waves, and periods of the plurality of periodic waves are equal to each other and at least one of amplitudes and phases of the plurality of periodic waves is different from each other.

The acquiring the modulated plurality of lights may include acquiring modulating the plurality of lights returning from the subject by using a modulating signal having a gain waveform.

The modulating signal may include a periodic wave having a same period as a periodic wave of the plurality of lights emitted to the subject.

A phase difference of $90 \times N°$ exists between the plurality of lights emitted to the subject, wherein N is a natural number.

The acquiring the distance information about the subject may include acquiring a depth image including the distance information by using the determined number of the plurality of lights.

According to an aspect of another exemplary embodiment, there is provided a device for acquiring information about a subject including: a processor configured to determine a number of a plurality of lights to be sequentially emitted onto the subject; a light source configured to emit the determined number of the plurality of lights onto the subject; and a modulator configured to modulate the plurality of lights returning from the subject, wherein the processor may be further configured to determine a weight based on at least one of the plurality of lights emitted from the light source and an emission order in which the light source emits the plurality of lights, and apply the weight to each of the modulated plurality of light to acquire distance information about the subject.

The processor may be further configured to determine the number of the plurality of lights to be one of 6 to 10 based on at least one of a type of noise to be filtered, the emission order, and an allowable error range.

The type of noise may include at least one of discontinuous noise generated irrespective of a lapse of time, linear function noise that linearly changes with the lapse of time, and quadratic function noise that changes in a form of a quadratic function with the lapse of time.

The processor may be further configured to: determine, from among a plurality of weight sets, a weight set indicating a weight corresponding to each of the modulated plurality of lights, according to at least one of the plurality of lights emitted from the light source and the emission order; and acquire the distance information about the subject by applying the weight indicated by the determined weight set to each of the modulated plurality of lights.

The processor may be further configured to: acquire at least one of a phase difference according to time-of-flight (TOF) and a motion blur index (MBI) by applying the weight indicated by the determined weight set to each of the modulated plurality of lights; and acquire the distance information about the subject based on the at least one of the phase and the MBI.

One of the plurality of lights emitted from the light source may be one of four types of periodic waves, and periods of the periodic waves are equal to each other and at least one of amplitudes and phases of the periodic waves is different from each other.

The modulator may be further configured to modulate the plurality of lights returning from the subject by using a modulating signal having a gain waveform.

The modulating signal may include a periodic wave having a same period as a periodic wave of the plurality of lights emitted from the light source.

A phase difference of 90×N° may exist between the plurality of lights emitted from the light source, wherein N is a natural number.

According to an aspect of another exemplary embodiment, there is provided a non-transitory computer-readable recording medium that stores a computer program executable by a computer to perform the method of acquiring information about the subject.

According to an aspect of another exemplary embodiment, there is provided a method of acquiring depth information of a subject including: emitting a plurality of lights to the subject; receiving the plurality of lights returning from the subject; determining a motion blur index (MBI) of an image that is obtained based on the plurality of lights returning from the subject; increasing a number of the plurality of lights to be emitted to the subject in response to the MBI being greater than a predetermined value; and acquiring the depth information of the subject based on the increased number of the plurality of lights in response to the MBI being greater than a predetermined value.

Phases of the plurality of lights may be different from each other, and the plurality of lights may be emitted to the subject in a first order. The method may further include changing an order in which the plurality of lights are emitted from the first order to a second order in response to the MBI being greater than a predetermined value.

BRIEF DESCRIPTION OF THE DRAWINGS

The above and/or other aspects will be more apparent by describing certain exemplary embodiments, with reference to the accompanying drawings in which:

FIG. 8 illustrates intensity images shown while processing a light, according to an exemplary embodiment;

FIG. 14 illustrates examples of discontinuous noise from among types of noise to be filtered by a device, according to an exemplary embodiment;

FIG. 19 illustrates examples of a device projecting emitting lights in a repeated projection order of 0°, 180°, 90°, and 270° to acquire distance information in which an error generated due to discontinuous noise is reduced, according to an exemplary embodiment;

FIG. 21 illustrates an example of a device projecting six emitting lights in a repeated projection order of 0°, 180°, 90°, and 270° to acquire distance information in which an error generated due to discontinuous noise is reduced, according to an exemplary embodiment;

FIG. 27 illustrates an example of a device acquiring distance information in which an error generated due to a change of amplitude is reduced, by using six emitting lights in a repeated projection order of 0°, 90°, 180°, and 270°, according to an exemplary embodiment;

FIG. 29 illustrates an example of a device acquiring distance information in which an error generated due to a change of amplitude is reduced, by using six emitting lights in a repeated projection order of 0°, 180°, 90°, and 270°, according to an exemplary embodiment;

FIG. 31 illustrates an example of a device acquiring distance information in which an error generated due to a change of amplitude is reduced, by using eight emitting lights in a repeated projection order of 0°, 90°, 180°, and 270°, according to an exemplary embodiment; and FIG. 32 illustrates an example of a device acquiring distance information in which an error generated due to a change of amplitude is reduced, by using ten emitting lights in a repeated projection order of 0°, 180°, 90°, and 270°, according to an exemplary embodiment.

DETAILED DESCRIPTION

Figure 1:
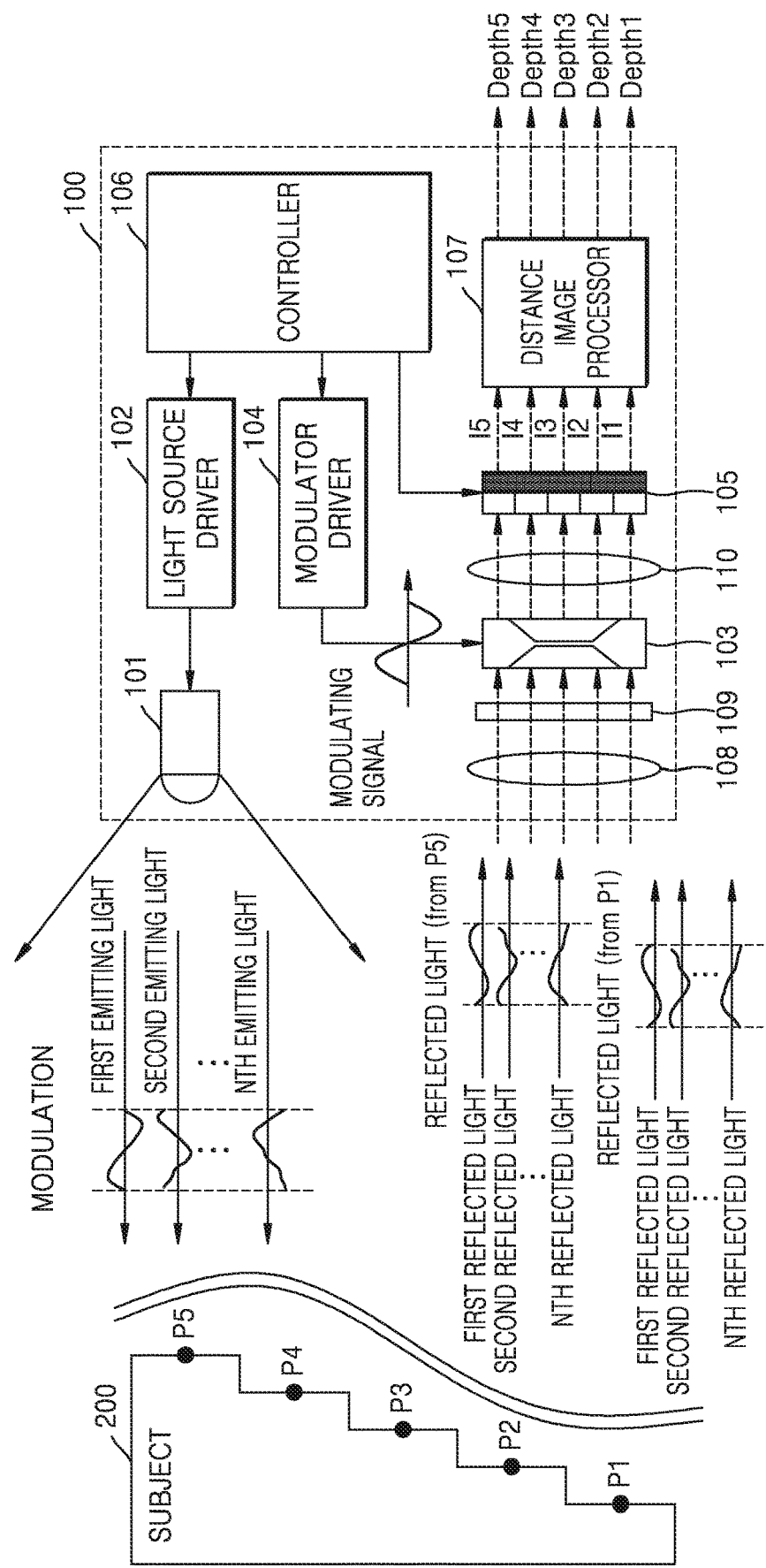
FIG. 1 illustrates a schematic structure of a device for acquiring distance information by using time-of-flight (TOF), according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

When a part "includes" or "comprises" an element, unless there is a particular description contrary thereto, the part can further include other elements, not excluding the other elements. Also, the term "unit" in the embodiments of the present disclosure means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

In the specification, when a region is "connected" to another region, the regions may not only be "directly connected", but may also be "electrically connected" via another device therebetween. Also, when a region "includes" an element, the region may further include another element instead of excluding the other element, otherwise differently stated.

In the specification, a "distance" may denote a spatially separated length, and a "depth" may be a type of distance. For example, distance information may include depth information.

As used herein, the term "and/or" includes any and all combinations of one or more of the associated listed items. Expressions such as "at least one of," when preceding a list of elements, modify the entire list of elements and do not modify the individual elements of the list.

In the specification, an image includes a charge-coupled device (CCD) image and a complementary metal-oxide semiconductor (CMOS) image sensor (CIS) image, but is not limited thereto.

Hereinafter, an 'image' may denote a still image or a moving image of a video, or a video itself.

FIG. 1 illustrates a schematic structure of a device 100 for acquiring distance information by using time-of-flight (TOF), according to an exemplary embodiment. Referring to FIG. 1, the device 100 may include a light source 101 generating light having a certain wavelength, a light source driver 102 that drives the light source 101, a modulator 103 that modulates a light reflected from a subject 200, a modulator driver 104 that drives the modulator 103, an image pickup device 105 that generates an image from the light modulated by the modulator 103, a distance image processor 107 that calculates distance information based on an output from the image pickup device 105, and a controller 106 that controls operations of the light source driver 102, the modulator driver 104, the image pickup device 105, and the distance image processor 107. The device 100 may further include a first lens 108 that focuses the reflected light on a region of the modulator 103 and a filter 109 that transmits a light having a certain wavelength and blocks a light beyond the wavelength. The filter 109 may be disposed between the first lens 108 and the modulator 103 along the travel path of the reflected light. Also, the device 100 may include a second lens 110 that is disposed between the modulator 103 and the image pickup device 105 and focuses a modulated light on a region of the image pickup device 105 may be further provided between the modulator 103 and the image pickup device 105.

The light source 101 may be, for example, a light-emitting diode (LED) or a laser diode (LD) capable of discharging light having a near-infrared ray (NIR) wavelength from about 800 nm to about 1100 nm, which is invisible to human sight for safety, but a wavelength band and a type of the light source 101 are not limited thereto. The light source driver 102 may drive the light source 101 via an amplitude modulation or phase modulation method according to a control signal received from the controller 106. According to a driving signal of the light source driver 102, an emitting light projected from the light source 101 onto the subject 200 may have a form of a periodic continuous function having a certain period. For example, the emitting light may have a specially-defined waveform, such as a sine wave, a ramp wave, or a square wave, or may have a general waveform that is not defined.

The modulator 103 modulates a light reflected from the subject 200 according to control of the modulator driver 104. The modulator driver 104 drives the modulator 103 according to a control signal received from the controller 106. For example, the modulator 103 may modulate an amplitude of a reflected light by changing a gain according to a modulating signal having a certain waveform provided by the modulator driver 104. Accordingly, the modulator 103 has a variable gain. The modulator 103 may operate at a high modulation speed from dozens to hundreds of MHz in order to identify a phase difference or a travel time of a light according to distance. Hereinafter, a phase difference may include a phase shift or a phase delay. In this regard, an image intensifier including a multi-channel plate (MCP), a GaAs-series solid-state modulator device, or a thin modulator device using an electro-optic material may be used as the modulator 103. In FIG. 1, the modulator 103 is shown to be a transmissive type, but a reflective type modulator may be alternatively used. The modulating signal may include a light modulating signal.

The image pickup device 105 generates an image by detecting the reflected light modulated by the modulator 103 according to control by the controller 106. When only a distance to one point of the subject 200 is to be measured, the image pickup device 105 may use a single optical sensor, such as a photodiode or an integrator. However, when distances to a plurality of the points of the subject 200 are to be measured, the image pickup device 105 may have a 2-dimensional (2D) or 1D array of a plurality of photodiodes or different optical detectors. For example, the image pickup device 105 may be a charge coupled device (CCD) image sensor or complementary metal-oxide semiconductor (CMOS) image sensor (CIS), which has a 2D array. Alternatively, the image pickup device 105 may be representatively designated as a CIS. The distance image processor 107 calculates distance information according to a distance information acquisition algorithm, based on an output of the image pickup device 105. The distance information acquisition algorithm may be pre-set. The distance image processor 107 may be embodied as an exclusive integrated circuit (IC) or as software provided in the device 100. When the distance image processor 107 is embodied as the software, the distance image processor 107 may be stored in a separate movable storage medium.

Hereinafter, operations of the device 100 having such a structure will be described.

First, the light source 101 sequentially projects N emitting lights having a certain period and waveform onto the subject 200 according to control of the controller 106 and the light source driver 102. Here, N may be a natural number equal to or higher than 3. For example, when four emitting lights are used, a first emitting light is generated and projected onto the subject 200 at a time T1, a second emitting light is generated and projected onto the subject 200 at a time T2, a third emitting light is generated and projected onto the subject 200 at a time T3, and then a fourth emitting light is generated and projected onto the subject 200 at a time T4. The first through fourth emitting lights sequentially projected onto the subject 200 may have a form of a continuous function having a certain period, such as a sine wave. For example, the first through fourth emitting lights may have periodic waves in which periods and waveforms are the same but amplitudes or phases are different. As another example, the first through fourth emitting lights may have periodic waves in which periods, waveforms, and amplitudes are the same but phases are different. For example, phases of the first through fourth emitting lights may differ by 90°, and in this case, the phase of the first emitting light may be slower than that of the second emitting light by 90°, the phase of the second emitting light may be slower than that of the third emitting light by 90°, and the phase of the third emitting light may be slower than that of the fourth emitting light by 90°. Alternatively, in this case, the phase of the first emitting light may be faster than that of the second emitting light by 90°, the phase of the second emitting light may be faster than that of the third emitting light by 90°, and the phase of the third emitting light may be faster than that of the fourth emitting light by 90°.

As another example, when the device 100 projects six emitting lights onto a subject, first through sixth emitting lights may have periodic waves in which periods, waveforms, and amplitudes are the same but phases are different. For example, phases of the first through sixth emitting lights may differ by 90°, and in this case, the phase of the first emitting light may be slower than that of the second emitting light by 90°, the phase of the second emitting light may be slower than that of the third emitting light by 90°, and the phase of the third emitting light may be slower than that of the fourth emitting light by 90°. Also, the first and fifth emitting lights may have the same periods, waveforms, amplitudes, and phases. Also, the second and sixth emitting lights may have the same periods, waveforms, amplitudes, and phases. Here, the term "same" is not limitedly interpreted as a meaning of being physically identically embodied in the real world, and may mean a sameness within a realistic error range.

The emitting light projected onto the subject 200 is reflected from a surface of the subject 200 and incident on the first lens 108. Generally, the subject 200 has a plurality of surfaces having different distances from the device 100. For convenience of description, FIG. 1 illustrates the subject 200 having five surfaces P1 through P5 at different distances from the device 100. When an emitting light is reflected from the five surfaces P1 through P5, five reflected lights having different time delays (i.e., different phases) are generated. For example, when the first emitting light is reflected from the five surfaces P1 through P5 of the subject 200, five first reflected lights having different phases are generated, when the second emitting light is reflected from the five surfaces P1 through P5 of the subject 200, five second reflected lights having different phases are generated, and similarly, when an $N^{th}$ emitting light is reflected from the five surfaces P1 through P5 of the subject 200, five $N^{th}$ reflected lights having different phases are generated. A reflected light reflected from the surface P1 that is farthest from the device 100 may reach the first lens 108 after a time delay of $\phi_{P1}$, and a reflected light reflected from the surface P5 that is closest to the device 100 may reach the first lens 108 after a time delay of $\phi_{P5}$ that is smaller than $\phi_{P1}$.

The first lens 108 focuses a reflected light into a region of the modulator 103. The filter 109 configured to transmit only a light having a certain wavelength may be provided between the first lens 108 and the modulator 103 so as to remove background light or miscellaneous light other than light of the certain wavelength. For example, when the light source 101 emits a light having a near-infrared ray (NIR) wavelength of about 850 nm, the filter 109 may be an IR band-pass filter that transmits an NIR wavelength band of about 850 nm. Accordingly, a light incident on the modulator 103 may be predominantly the light emitted from the light source 101 and reflected from the subject 200. In FIG. 1, the filter 109 is provided between the first lens 108 and the modulator 103, but locations of the first lens 108 and the filter 109 may be switched. For example, an NIR light that first passed through the filter 109 may be focused on the modulator 103 by the first lens 108.

Then, the modulator 103 modulates a reflected light to a modulating signal having a certain waveform. A period of a gain waveform in the modulator 103 may be the same as a waveform period of an emitting light. In FIG. 1, the modulator 103 may modulate and provide the five first reflected lights reflected from the five surfaces P1 through P5 of the subject 200 to the image pickup device 105, and then may sequentially modulate and provide the five second reflected lights through the five $N^{th}$ reflected lights to the image pickup device 105.

A light having an amplitude modulated by the modulator 103 is magnification-adjusted and re-focused as the light passes through the second lens 110, and then reaches the image pickup device 105. Accordingly, the modulated light is focused within a region of the image pickup device 105. The image pickup device 105 generates an image by receiving the modulated light for a certain exposure time. For example, as shown in (A) of FIG. 2, the image pickup device 105 receives the five first reflected lights that are modulated after being respectively reflected from the five surfaces P1 through P5 of the subject 200 for the certain exposure time to generate a first CIS image. Then, as shown in (B) of FIG. 2, the image pickup device 105 receives the five second reflected lights that are modulated after being respectively reflected from the five surfaces P1 through P5 of the subject 200 for the certain exposure time to generate a second CIS image. Such operations are repeated until as shown in (C) of FIG. 2, the image pickup device 105 receives the five $N^{th}$ five reflected lights that are modulated after being respectively reflected from the five surfaces P1 through P5 of the subject 200 for the certain exposure time to generate an $N^{th}$ CIS image. As such, N different CIS images may be sequentially obtained as shown in (D) of FIG. 2. Each of the first through $N^{th}$ CIS images may be a sub-frame for generating an image of one frame having distance information. For example, when Td denotes a period of one frame, the certain exposure time of the image pickup device 105 for obtaining each of the first through $N^{th}$ CIS images may be about Td/N.

Figure 2:
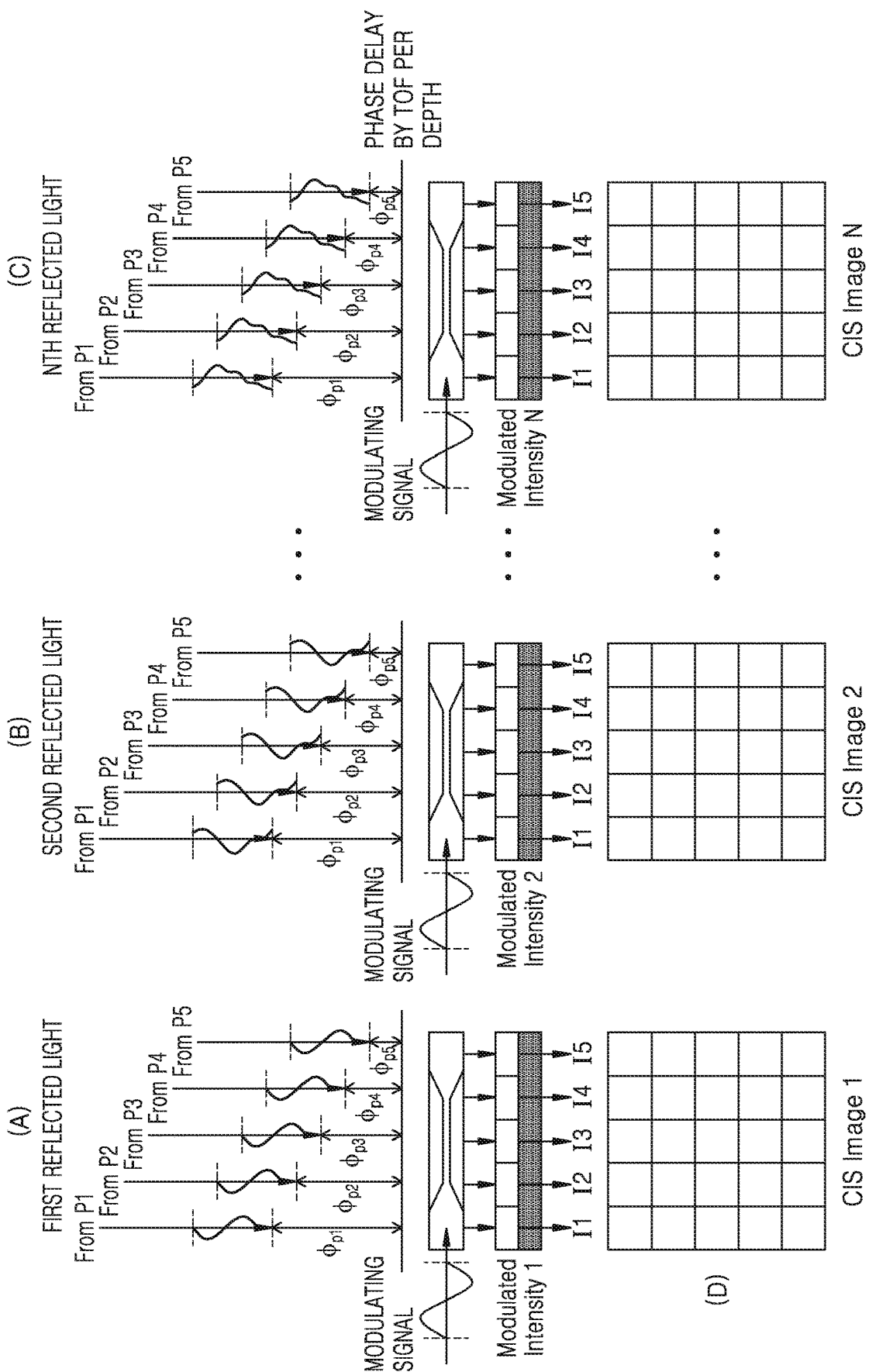
FIG. 2 illustrates processes of generating, by an image pickup device, N images after N reflected lights are modulated, according to an exemplary embodiment.

Referring back to (A) of FIG. 2, in a first sub-frame, the five first reflected lights are generated when the first emitting light that is projected onto the subject 200 from the light source 101 is reflected respectively from the five surfaces P1 through P5 of the subject 200. The five first reflected lights reach the image pickup device 105 after being modulated by the modulator 103. For convenience of description, FIG. 2 illustrates the image pickup device 105 having only five pixels respectively corresponding to the five surfaces P1 through p5. Accordingly, the five first reflected lights may be respectively incident on the five pixels. As shown in (A) of FIG. 2, the five first reflected lights reflected from the surfaces P1 through p5 have different phase differences $\phi_{P1}$ to $\phi_{P5}$ according to distances from the device 100 to the surfaces P1 through P5. For example, the image pickup device 105 may generate the first CIS image by capturing the first reflected light for an exposure time of about Td/N. In the same manner, the second through $N^{th}$ CIS images may be generated from a second sub-frame to an $N^{th}$ sub-frame. As shown in (B) and (C) of FIG. 2, different phase differences $\phi_{P1}$ to $\phi_{P5}$ are generated in the second through $N^{th}$ sub-frames according to the distances from the device 100 to the surfaces P1 through P5.

Figure 3:
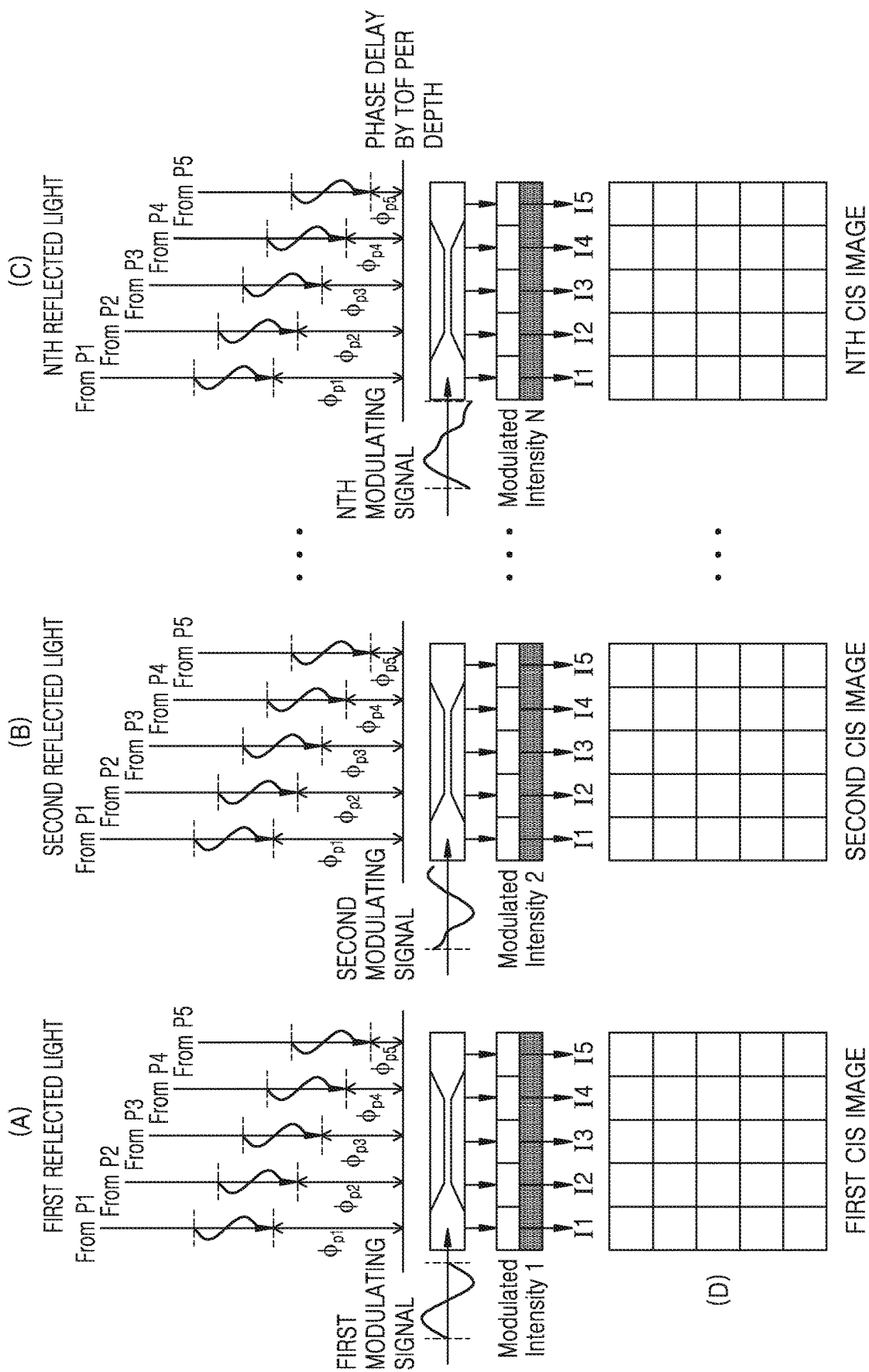
FIG. 3 illustrates processes of generating N images by using one emitting light and N modulating signals, according to an embodiment.

In FIGS. 2 and 3, N different CIS images are generated by using N emitting lights and N reflected lights. However, one emitting light may be used in all sub-frames and the modulator 103 may modulate a reflected light to have different gain waveforms per sub-frame.

FIG. 3 illustrates processes of generating N CIS images by using one emitting light and N different gain waveforms, according to an exemplary embodiment. Referring to (A) through (D) of FIG. 3, reflected lights reflected from the subject 200 have the same waveforms and phases in all sub-frames. As described above, different phase differences $\phi_{P1}$ to $\phi_{P5}$ exist in the reflected lights of each sub-frame based on the surfaces P1 through P5 of the subject 200. As shown in (A) through (C) of FIG. 3, the modulator 103 modulates a first modulating signal to a reflected light in a first sub-frame, modulates a second modulating signal that is different from the first modulating signal to a reflected light in a second sub-frame, and modulates an $N^{th}$ modulating signal to a reflected light in an $N^{th}$ sub-frame. Here, the first through $N^{th}$ modulating signals may have different waveforms, or may have the same periods and waveforms while having different phases. Then, as shown in (D) of FIG. 3, first through $N^{th}$ CIS images that are different from each other may be obtained.

The first through $N^{th}$ CIS images obtained as such are transmitted to the distance image processor 107. The distance image processor 107 may acquire distance information according to a pre-set algorithm by using the first through $N^{th}$ CIS images. For example, the device 100 may acquire the distance information by using an averaging algorithm.

Figure 4:
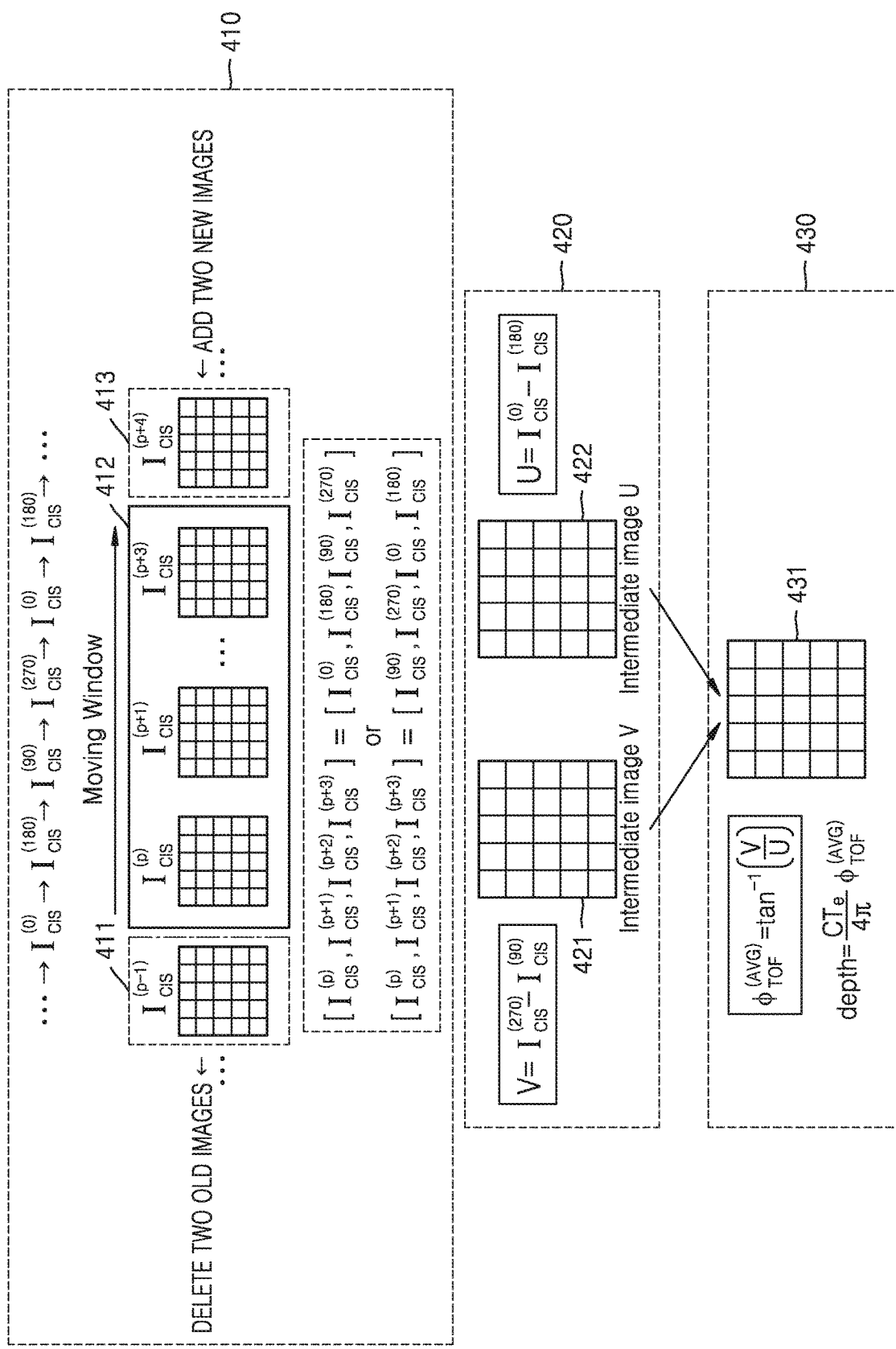
FIG. 4 illustrates a method of generating four images by using four emitting lights and acquiring distance information by using the generated four images, according to an exemplary embodiment.

FIG. 4 illustrates a method of generating four images by using four emitting lights and acquiring distance information by using the generated four images, according to an exemplary embodiment.

As shown in a first region 410, the device 100 according to an exemplary embodiment may acquire four intensity images via sequential capturing. For example, the device 100 according to an exemplary embodiment may obtain an intensity image $I_{CIS}^{(0)}$ having a phase difference of 0°, an intensity image $I_{CIS}^{(90)}$ having a phase difference of 90°, an intensity image $I_{CIS}^{(180)}$ having a phase difference of 180°, and an intensity image $I_{CIS}^{(270)}$ having a phase difference of 270°. The device 100 according to an exemplary embodiment may acquire four CIS images by using a moving average. In the present exemplary embodiment, a modulated image is displayed as a CIS image, but the image pickup device 105 is not limited to a CIS.

The device 100 according to an exemplary embodiment may acquire four images in an order shown in Equation 1.

$$\rightarrow I_{CIS}^{(0)} \rightarrow I_{CIS}^{(180)} \rightarrow I_{CIS}^{(90)} \rightarrow I_{CIS}^{(270)} \rightarrow I_{CIS}^{(0)} \rightarrow I_{CIS}^{(180)} \rightarrow \quad \text{[Equation 1]}$$

In other words, a subject is captured in an order of 0, 180, 90, and 270 degrees to obtain consecutive images. As illustrated in FIG. 4, the four images including $[I_{CIS}^{(0)}, I_{CIS}^{(180)}, I_{CIS}^{(90)}, I_{CIS}^{(270)}]$ are combined such that two new images are captured and two prior images are sequentially removed. Therefore, a combination of images are obtained as expressed in Equation 2 below:

$$[I_{CIS}^{(p)}, I_{CIS}^{(p+1)}, I_{CIS}^{(p+2)}, I_{CIS}^{(p+3)}] = [I_{CIS}^{(0)}, I_{CIS}^{(180)}, I_{CIS}^{(90)}, I_{CIS}^{(270)}]$$

$$[I_{CIS}^{(p)}, I_{CIS}^{(p+1)}, I_{CIS}^{(p+2)}, I_{CIS}^{(p+3)}] = [I_{CIS}^{(90)}, I_{CIS}^{(270)}, I_{CIS}^{(0)}, I_{CIS}^{(180)}] \quad \text{[Equation 2]}$$

Here, p denotes an arbitrary number.

For example, when four images currently acquired by the device 100 are $[I_{CIS}^{(0)}, I_{CIS}^{(180)}, I_{CIS}^{(90)}, I_{CIS}^{(270)}]$, two images acquired first may be sequentially removed and two new images may be acquired to acquire a combination of four images, i.e., $[I_{CIS}^{(90)}, I_{CIS}^{(270)}, I_{CIS}^{(0)}, I_{CIS}^{(180)}]$. For example, a first image 411 may be removed and a second image 413 may be added. As another example, when four images currently acquired by the device 100 are $[I_{CIS}^{(90)}, I_{CIS}^{(270)}, I_{CIS}^{(0)}, I_{CIS}^{(180)}]$, two images acquired first may be sequentially removed and two new images may be acquired to acquire a combination of four images, i.e., $[I_{CIS}^{(0)}, I_{CIS}^{(180)}, I_{CIS}^{(90)}, I_{CIS}^{(270)}]$.

The four images obtained by using a moving window method are divided into two groups, i.e., first and second groups U and V in a second region 420. The first group U is divided into $I_{CIS}^{(0)}$ and $I_{CIS}^{(180)}$, and the second group V is divided into $I_{CIS}^{(90)}$ and $I_{CIS}^{(270)}$. A first intermediate image 421 and a second intermediate image 422 illustrated in FIG. 4 are formed based on a difference between images of the first group U and images of the second group V.

For example, the device 100 may acquire the first intermediate image 421 indicated by $I_{CIS}^{(270)} - I_{CIS}^{(90)}$ and the second intermediate image U 422 indicated by $I_{CIS}^{(0)} - I_{CIS}^{(180)}$.

In a third region 430, the device 100 may acquire a depth image 431 by using the first intermediate image 421 and the second intermediate image 422 based on Equation 3:

$$\Rightarrow \text{depth} = \frac{c}{4\pi f} \tan^{-1}\left(\frac{-I_{CIS}^{(90)} + I_{CIS}^{(270)}}{I_{CIS}^{(0)} - I_{CIS}^{(180)}}\right) \quad \text{[Equation 3]}$$

Accordingly, the device 100 may acquire one depth image during a time of acquiring two IR images.

In FIG. 4, distance information is acquired by using four emitting lights, but this is only an example, and as will be described below, the device 100 according to an exemplary embodiment may acquire distance information by using at least six emitting lights in the manner described with reference to FIG. 4. For example, one depth image may be acquired while two intensity images are acquired in a manner in which one depth image is acquired by using intensity images I1 through I6 and one depth image is acquired by using intensity images I3 through I8 while the intensity images I1 through I8 are acquired.

The device 100 according to an exemplary embodiment may acquire intensity images in an order of 0°, 90°, 180°, and 270°, and acquire a depth image by using a moving window method. For example, when there are intensity images I1 through I8 acquired in an order of 0°, 90°, 180°, and 270°, the device 100 may acquire a first depth image by using the six intensity images I1 through I6, a second depth image by using the six intensity images I2 through I7, and a third depth image by using the six intensity images I3 through I8. As another example, when there are intensity images I1 through I10 acquired in an order of 0°, 90°, 180°, and 270°, the device 100 may acquire a first depth image by using the eight intensity images I1 through I8 and a second depth image by using the eight intensity images I3 through I10. As another example, when there are intensity images I1 through I12 acquired in an order of 0°, 180°, 90°, and 270°, the device 100 may acquire a first depth image by using ten intensity images I1 through I10 and a second depth image by using ten intensity images I3 through I12.

A method of acquiring distance information by applying a weight to at least six emitting lights will be described in detail later with reference to FIG. 7.

Figure 5A:
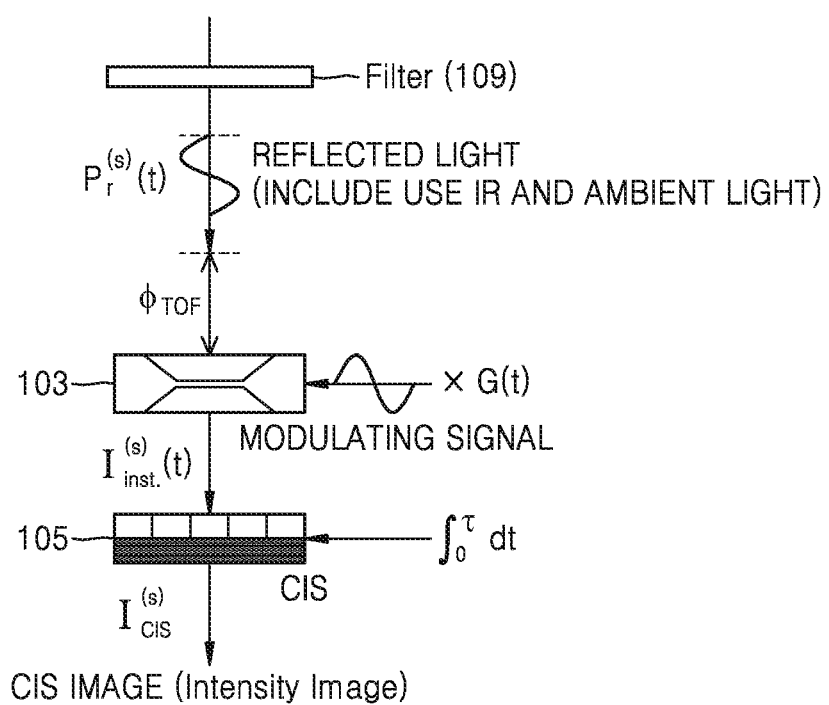
FIG. 5A illustrates a method of acquiring a complementary metal-oxide semiconductor (CMOS) image sensor (CIS) image by using a reflected light and a modulating signal, according to an exemplary embodiment.

FIG. 5A illustrates a method of acquiring a CIS image by using a reflected light and a modulating signal, according to an exemplary embodiment. In FIG. 5A, a process of processing an IR light may be described.

In the present exemplary embodiment, $P_e^{(s)}$ denotes an optical power of an $S^{th}$ emitting light, $\theta^{(s)}$ may denote a phase difference of the $S^{th}$ emitting light, $\overline{P}_{ave}$ denotes an emitting light direct current (DC) offset, $P_r^{(s)}$ denotes an optical power of an $S^{th}$ received reflected light, $\overline{P}_a$ denotes a received ambient light, r denotes light attenuation of a surface of a subject, G denotes a shutter gain, $\overline{G}_{ave}$ denotes a shutter gain DC offset, w denotes an operating frequency, and $\emptyset_{TOF}$ denotes a phase difference due to TOF.

The optical power of the $S^{th}$ emitting light may be represented according to Equation 4.

$$P_e^{(s)}(t) = a \cdot \text{rect}(\omega t - \theta^{(s)}) + \overline{P}_{ave}, \; s=1,2,\ldots,4 \quad \text{[Equation 4]}$$

Here, rect may be obtained by adding a DC component to a square wave (alternating current (AC)).

A reflected light ($P_r^{(s)}$) that has passed through a filter may be represented according to Equation 5. Since the reflected light, which is to pass through the filter, is reflected back from a surface of a subject, the reflected light may be in a form in which a reflectance r, which synthetically considers a surface reflectance of an object, an incident angle of a light source with respect to the normal of the object, a distance between the light source and the object, and a size of a lens, is multiplied. Also, a phase difference due to TOF may exist and an ambient light may exist.

$$P_r^{(s)}(t) = r[a \cdot \text{rect}(\omega t - \theta^{(s)} - \phi_{TOF}) + \overline{P}_{ave}] + r\overline{P}_a \quad \text{[Equation 5]}$$

A modulated waveform (gain) of a shutter may be represented according to Equation 6.

$$G(t) = c\sin(\omega t) + \overline{G}_{ave} \quad \text{[Equation 6]}$$

For example, the modulated waveform (G(t)) of the shutter may be obtained by adding a DC component to a sine wave (AC).

A light reaching the image pickup device 105 may be represented according to Equation 7.

$$I_{inst}^{(s)}(t) = P_r^{(s)}(t) \times G(t) = r[a \cdot \text{rect}(\omega t - \theta^{(s)} - \phi_{TOF}) + (\overline{P}_{ave} + \overline{P}_a)] \times [c\sin(\omega t) + \overline{G}_{ave}], \, s=1,2,\ldots,4 \quad \text{[Equation 7]}$$

An image acquired by the image pickup device 105 may be represented according to Equation 8.

$$I_{CIS}^{(s)} \equiv \frac{1}{T}\int_0^T I_{inst.}^{(s)}(t)dt = \quad \text{[Equation 8]}$$

$$\frac{rac}{2\pi}\left[\int_{\theta^{(s)}+\phi_{TOF}}^{\theta^{(s)}+\phi_{TOF}+\pi}(1)\cdot\sin\omega t d\omega t + \int_{\theta^{(s)}+\phi_{TOF}+\pi}^{\theta^{(s)}+\phi_{TOF}+2\pi}(-1)\cdot\sin\omega t d\omega t\right] +$$

$$r(\overline{P}_{ave} + \overline{P}_a)\overline{G}_{ave} = \frac{rac}{2\pi}[-\cos(\theta^{(s)} + \phi_{TOF} + \pi) + \cos(\theta^{(s)} + \phi_{TOF}) +$$

$$\cos(\theta^{(s)} + \phi_{TOF} + 2\pi) - \cos(\theta^{(s)} + \phi_{TOF} + \pi)] + r(\overline{P}_{ave} + \overline{P}_a)\overline{G}_{ave} =$$

$$\frac{rac}{\pi}[-\cos(\theta^{(s)} + \phi_{TOF} + \pi) + \cos(\theta^{(s)} + \phi_{TOF})] + r(\overline{P}_{ave} + \overline{P}_a)\overline{G}_{ave} =$$

$$r \cdot \frac{2}{\pi} \cdot ac \cdot \cos(\theta^{(s)} + \phi_{TOF}) + r \cdot (\overline{P}_{ave} + \overline{P}_a)\overline{G}_{ave} =$$

$$rA \cdot \cos(\theta^{(s)} + \phi_{TOF}) + rB, \, s = 1, 2, \ldots, 4$$

Four images consecutively acquired according to Equation 8 may be represented respectively according to Equation 9 through Equation 12.

$$I_{CIS}^{(0)} = rA\cos\phi_{TOF} + rB \quad \text{[Equation 9]}$$

$$I_{CIS}^{(180)} = -rA\cos\phi_{TOF} + rB \quad \text{[Equation 10]}$$

$$I_{CIS}^{(90)} = -rA\sin\phi_{TOF} + rB \quad \text{[Equation 11]}$$

$$I_{CIS}^{(270)} = -rA\sin\phi_{TOF} + rB \quad \text{[Equation 12]}$$

Also, Equations 9 through 12 may satisfy a condition of Equation 13.

$$A = \frac{2}{\pi} \cdot ac, \, B = (\overline{P}_{ave} + \overline{P}_a)\overline{G}_{ave} \quad \text{[Equation 13]}$$

A phase image $I_{CIS}$ acquired from an image pickup device may be obtained by multiplying a reflectance r by parameters A and B as in Equations 8 and 13. According to an exemplary embodiment, the parameter A may be obtained by multiplying an amplitude a of intensity of a light source and a modulated amplitude c of a shutter, and the parameter B may be obtained by multiplying a DC component of the shutter by a sum of average intensity of the light source and average intensity of an external light. When a drift is generated in driving signals of the light source and the shutter for a certain period of time, the parameter B may change according to time.

The above equations may be used even when the optical power of the $S^{th}$ emitting light in Equation 4 is realized in triangular waves (sine), and in this case, the parameter A may be a parameter A'. For example, the parameter A' may be represented according to Equation 14.

$$A' = \frac{1}{2} \cdot ac \quad \text{[Equation 14]}$$

When $\emptyset_{TOF}$ is solved by erasing known r, A, and B from Equations 9 through 12, a phase difference according to depth may be acquired as shown in [Equation 3] or [Equation 15]

$$\phi_{TOF} = \tan^{-1}\left(\frac{-I_{CIS}^{(90)} + I_{CIS}^{(270)}}{I_{CIS}^{(0)} - I_{CIS}^{(180)}}\right) \quad \text{[Equation 15]}$$

Equations 9 through 15 may be applied to a still image. For example, Equations 9 through 15 may be applied to a subject that is not moving.

Also, Equation 16 may be obtained from Equation 3 and Equation 15.

$$\text{depth} = \frac{C}{4\pi f}\phi_{TOF} = \frac{C}{4\pi f}\tan^{-1}\left(\frac{-I^{(270)} - I^{(90)}}{I^{(0)} - I^{(180)}}\right) \quad \text{[Equation 16]}$$

In FIG. 5A, a method of acquiring distance information by using four emitting lights is illustrated for convenience, but such a method of FIG. 5A is only an example, and the device 100 may acquire distance information by using at least six emitting lights as will be described with reference to FIG. 7.

Figure 5B:
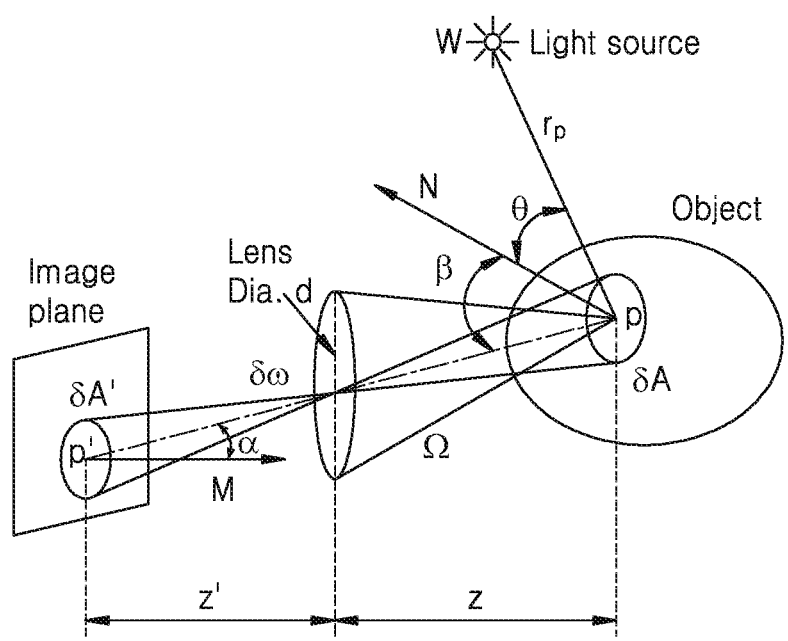
FIG. 5B is a diagram for describing a reflectance while acquiring a depth image, according to an exemplary embodiment.

FIG. 5B is a diagram for describing a reflectance while acquiring a depth image, according to an exemplary embodiment.

In relation to the reflectance, r may be represented according to Equation 17.

$$r(p') = k\frac{1}{r_p^2}\rho_d\cos(\theta) \quad \text{[Equation 17]}$$

A reflectance r(p') may be related to an incident angle θ of a light source, a reflectance ρd according to a color of a surface of an object, and a distance rp between the light source and the object as shown in FIG. 5B, and a constant k may be related to a diameter d of a lens and a focal length of the lens. When a distance sensor instantaneously moves or the object moves, the reflectance r(p') changes continuously or discontinuously according to time, and thus noise may be induced in an amplitude rA or brightness rB of a phase image. Hereinafter, in some exemplary embodiments, rA may be indicated as A and rB may be indicated as B.

Figure 6:
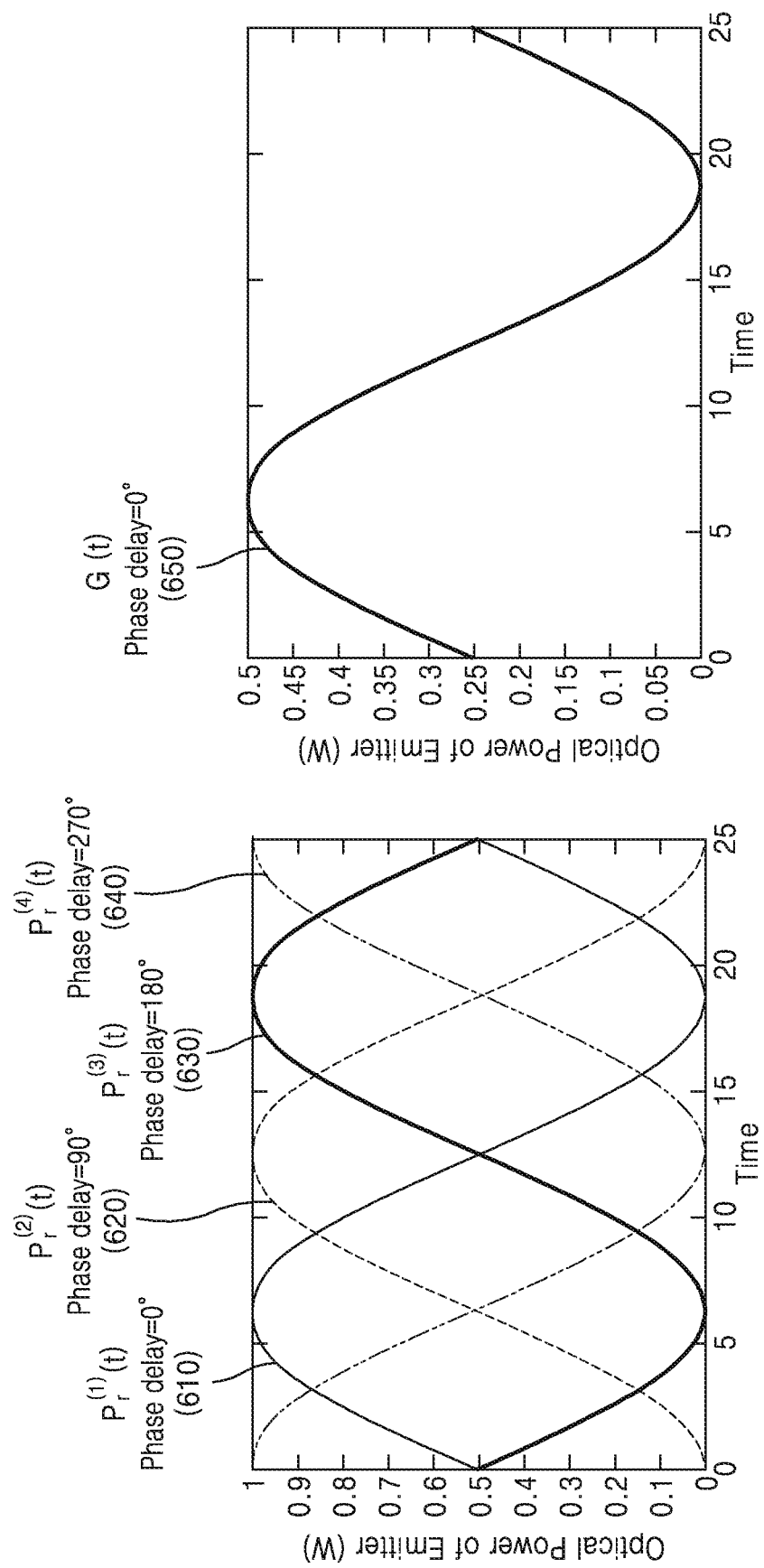
FIG. 6 illustrates four reflected lights having different phases, according to an exemplary embodiment.

FIG. 6 illustrates four reflected lights having different phases, according to an exemplary embodiment.

Four different reflected lights according to an embodiment may be a first reflected light 610, a second reflected light 620, a third reflected light 630, and a fourth reflected light 640. Phases of the first through fourth reflected lights 610 through 640 may sequentially differ from each other by 90°. For example, a phase difference of the first reflected light 610 may be 0°, a phase difference of the second reflected light 620 may be 90°, a phase difference of the third reflected light 630 may be 180°, and a phase difference of the fourth reflected light 640 may be 270°.

A modulated waveform (G(t)) 650 of a shutter according to an embodiment may b obtained by adding a DC component to a sine wave (AC).

In FIG. 6, four reflected lights having different phases are illustrated as an example, but the device 100 may acquire distance information by using at least six reflected lights. For example, the device 100 may acquire distance information about a subject by using not only the first through fourth reflected lights 610 through 640, but also fifth through eighth reflected lights (not shown) having the same phase differences respectively as the first through fourth reflected lights 610 through 640.

Figure 7:
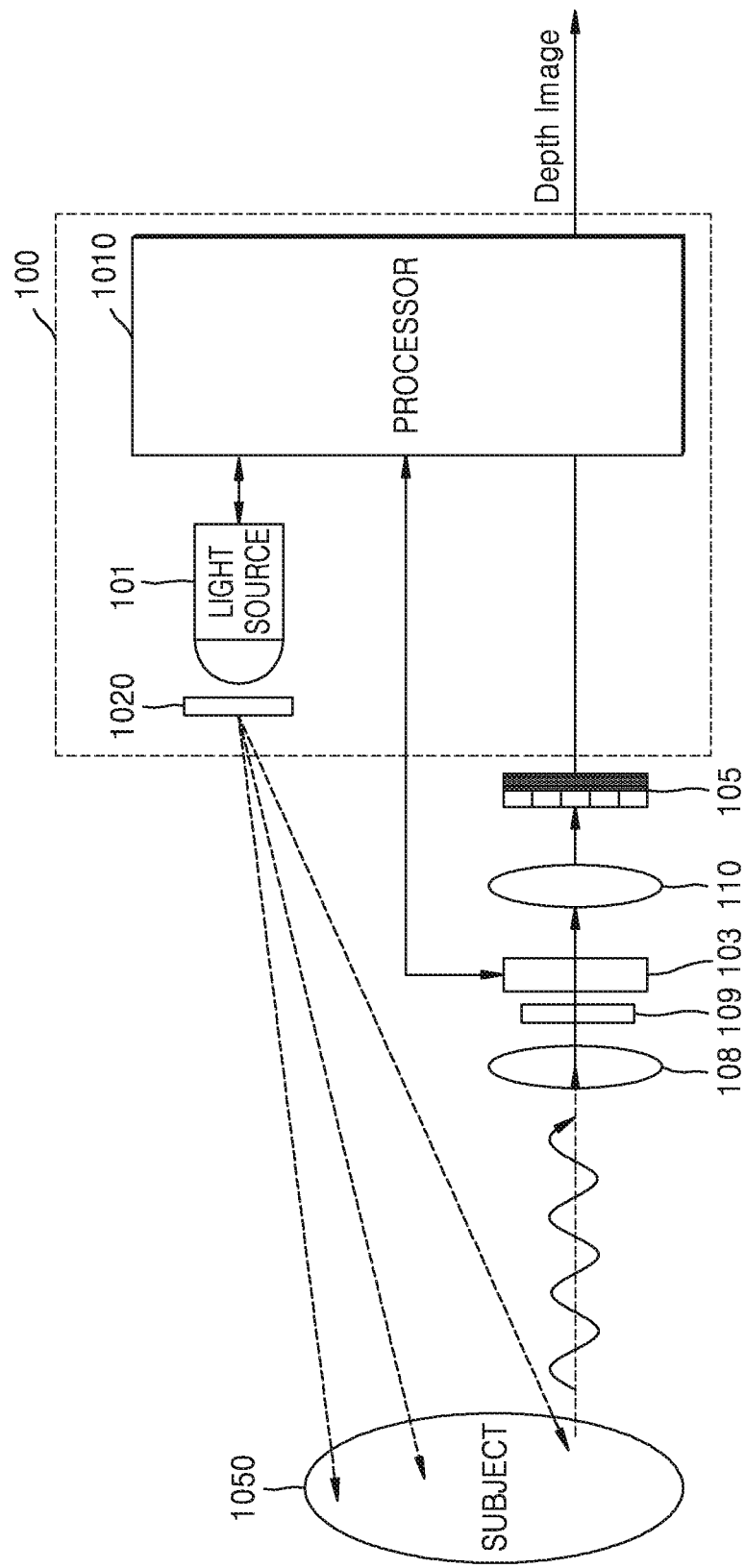
FIG. 7 is a block diagram of a device according to an exemplary embodiment.

FIG. 7 is a block diagram of the device 100 according to an exemplary embodiment.

As shown in FIG. 7, the device 100 may include the light source 101 and a processor 1010. However, the device 100 may be realized by using more or less components than those shown in FIG. 7. For example, the device 100 according to an embodiment may further include a diffuser 1020 or the modulator 103.

The components of the device 100 will now be described.

The light source 101 according to an exemplary embodiment may sequentially project a plurality of emitting lights having different phases onto a subject 1050, according to a control signal received from the processor 1010. The light source 101 may use the diffuser 1020 to obtain spatially uniform light intensity while projecting at least one emitting light onto the subject 1050.

For example, the light source 101 may project one or more emitting lights according to a number and projection order indicated by a control signal received from the processor 1010 onto the subject 1050 through the diffuser 1020. For example, the light source 101 may sequentially project six emitting lights respectively having phase differences of 0°, 90°, 180°, 270°, 0°, and 90° onto the subject 1050 according to the control signal received from the processor 1010. As another example, the light source 101 may sequentially project six emitting lights respectively having phase differences of 0°, 180°, 90°, 270°, 0°, and 180° onto the subject 1050 according to the control signal received from the processor 1010. As another example, the light source 101 may sequentially project seven emitting lights respectively having phase differences of 0°, 90°, 180°, 270°, 0°, 90°, and 180° onto the subject 1050 according to the control signal received from the processor 1010. As another example, the light source 101 may sequentially project seven emitting lights respectively having phase differences of 0°, 180°, 90°, 270°, 0°, 180°, and 90° onto the subject 1050 according to the control signal received from the processor 1010. The light source 101 according to an embodiment may project six to ten emitting lights in an order of 0°, 90°, 180°, and 270° or of 0°, 180°, 90°, and 270° according to the control signal received from the processor 1010.

As another method of obtaining images having different phases, the device 100 may obtain six to ten phase images by sequentially phase-transiting a light modulator according to the number of phase differences while a light source is projecting a modulating light having a temporally uniform period.

The processor 1010 according to an exemplary embodiment may determine the number and/or a projection order of a plurality of emitting lights to be sequentially projected onto the subject 1050. For example, the processor 1010 may determine the number of emitting lights to be one of six to ten based on at least one of a type of noise to be filtered, the projection order of the emitting lights, and an allowable error range. As another example, the processor 1010 may determine the projection order of the emitting lights to be one of an order of 0°, 90°, 180°, and 270° and an order of 0°, 180°, 90°, and 270° based on at least one of the type of noise to be filtered, and the allowable error range.

The processor 1010 according to an exemplary embodiment may acquire distance information about the subject 1050 by using a modulated reflected light acquired from the determined number of emitting lights. For example, the processor 1010 may acquire a depth image by using the modulated reflected light acquired from the determined number of emitting lights. For example, the processor 1010 may generate a depth image about the subject 1050 by using the modulated reflected light acquired from six emitting lights.

The type of noise to be filtered may include at least one of discontinuous noise generated irrespective of the lapse of time, linear function noise that changes linearly with the lapse of time, and a quadratic function noise that changes in a form of a quadratic function with the lapse of time. Noise that changes in a form of a linear or quadratic function may simultaneously or individually affect an amplitude and brightness in a phase image. For example, a value of amplitude may change linearly or in a form of a quadratic function with the lapse of time due to noise. Effects of noise according to embodiments will be described later with reference to FIGS. 15, 16, 25, and 26.

The processor 1010 according to an exemplary embodiment may determine the number of emitting lights to be six so as to reduce an error caused by linear function noise, and determine the projection order to be in an order of 0°, 90°, 180°, and 270°. Also, the processor 1010 may determine a weight applied to each of modulated reflected lights according to the number and projection order of the emitting lights.

For example, the processor 1010 may determine, from among a plurality of weight sets, a weight set indicating weights respectively corresponding to a plurality of modulated reflected lights, based on the determined number and/or the determined projection order. Also, the processor 1010 may acquire the distance information about the subject 1050 by applying the weights indicated by the determined weight set respectively to the plurality of modulated reflected lights.

Details about the current exemplary embodiment will be described later with reference to FIG. 17.

Also, in the present specification, applying of a weight to a reflected light may denote applying of a weight to a reflected light itself or to a signal acquired according to the reflected light. For example, applying of a first weight to a first reflected light may denote applying the first weight to a first CIS image acquired through the first reflected light.

The processor 1010 according to another exemplary embodiment may determine the number of emitting lights to be seven so as to reduce an error caused by linear function noise, and determine the projection order to be an order of 0°, 90°, 180°, and 270°. Also, the processor 1010 may determine a weight applied to each of modulated reflected lights according to the determined number and the determined projection order, as will be described later with reference to FIG. 18.

The processor 1010 according to another exemplary embodiment may determine the projection order to be an order of 0°, 180°, 90°, and 270° so as to reduce an error caused by discontinuous noise. Also, the processor 1010 may determine a weight applied to each of modulated reflected lights according to the determined number and the determined projection order, as will be described later with reference to FIG. 19.

The processor 1010 according to another exemplary embodiment may determine the number of emitting lights to be six so as to reduce an error caused by linear function noise, and determine the projection order to be an order of 0°, 180°, 90°, and 270°. Also, the processor 1010 may determine a weight applied to each of modulated reflected lights according to the determined number and the determined projection order, as will be described later with reference to FIG. 20.

The processor 1010 according to another exemplary embodiment may determine the number of emitting lights to be six so as to reduce an error caused by discontinuous noise, and determine the projection order to be an order of 0°, 180°, 90°, and 270°. Also, the processor 1010 may determine a weight applied to each of modulated reflected lights according to the determined number and the determined projection order, as will be described later with reference to FIG. 21.

The processor 1010 according to another exemplary embodiment may determine the number of emitting lights to be eight so as to reduce an error caused by linear function noise, and determine the projection order to be an order of 0°, 180°, 90°, and 270°. Also, the processor 1010 may determine a weight applied to each of modulated reflected lights according to the determined number and the determined projection order, as will be described later with reference to FIG. 22.

The processor 1010 according to another exemplary embodiment may determine the number of emitting lights to be eight so as to reduce an error caused by linear function noise, and determine the projection order to be an order of 0°, 90°, 180°, and 270°. Also, the processor 1010 may determine a weight applied to each of modulated reflected lights according to the determined number and the determined projection order, as will be described later with reference to FIG. 23.

The processor 1010 according to another exemplary embodiment may determine the number of emitting lights to be ten so as to reduce an error caused by linear function noise and quadratic function noise, and determine the projection order to be an order of 0°, 180°, 90°, and 270°. Also, the processor 1010 may determine a weight applied to each of modulated reflected lights according to the determined number and the determined projection order, as will be described later with reference to FIG. 24.

Alternatively, the processor 1010 according to an exemplary embodiment may determine the number and projection order of the emitting lights in a pre-set manner so as to reduce an error caused by noise, and acquire distance information in which an error is reduced by applying, to each of modulated reflected lights, a weight determined according to the determined number and the determined projection order.

FIG. 8 illustrates intensity images I1 through I4 shown while processing a light, according to an exemplary embodiment.

The intensity images I1 through I4 in FIG. 8 may respectively correspond to the intensity images $I_{CIS}^{(0)}$ through $I_{CIS}^{(270)}$ of FIG. 4. For example, equations of the intensity images I1 through I4 may be acquired from the intensity images $I_{CIS}^{(0)}$ through $I_{CIS}^{(270)}$ by adding a value of r to a value of A or B in the intensity images $I_{CIS}^{(0)}$ through $I_{CIS}^{(270)}$ described above in Equations 9 through 12. Here, a motion blur index (MBI) may indicate a degree of a phase image changing according to a phase transition time. For example, when an amplitude A and brightness B of the phase image are uniform, MBI may be zero. The device 100 according to an exemplary embodiment may omit to acquire distance information with respect to a region in which an absolute value of MBI is higher than a threshold value, and such distance information may be acquired via an interpolation method using surrounding distance information during a post-process operation.

A graph 810 according to an exemplary embodiment shows the intensity images I1 through I4 according to a phase difference. The intensity images I1 through I4 shown in the graph 810 may be represented by equations 820.

Figure 9:
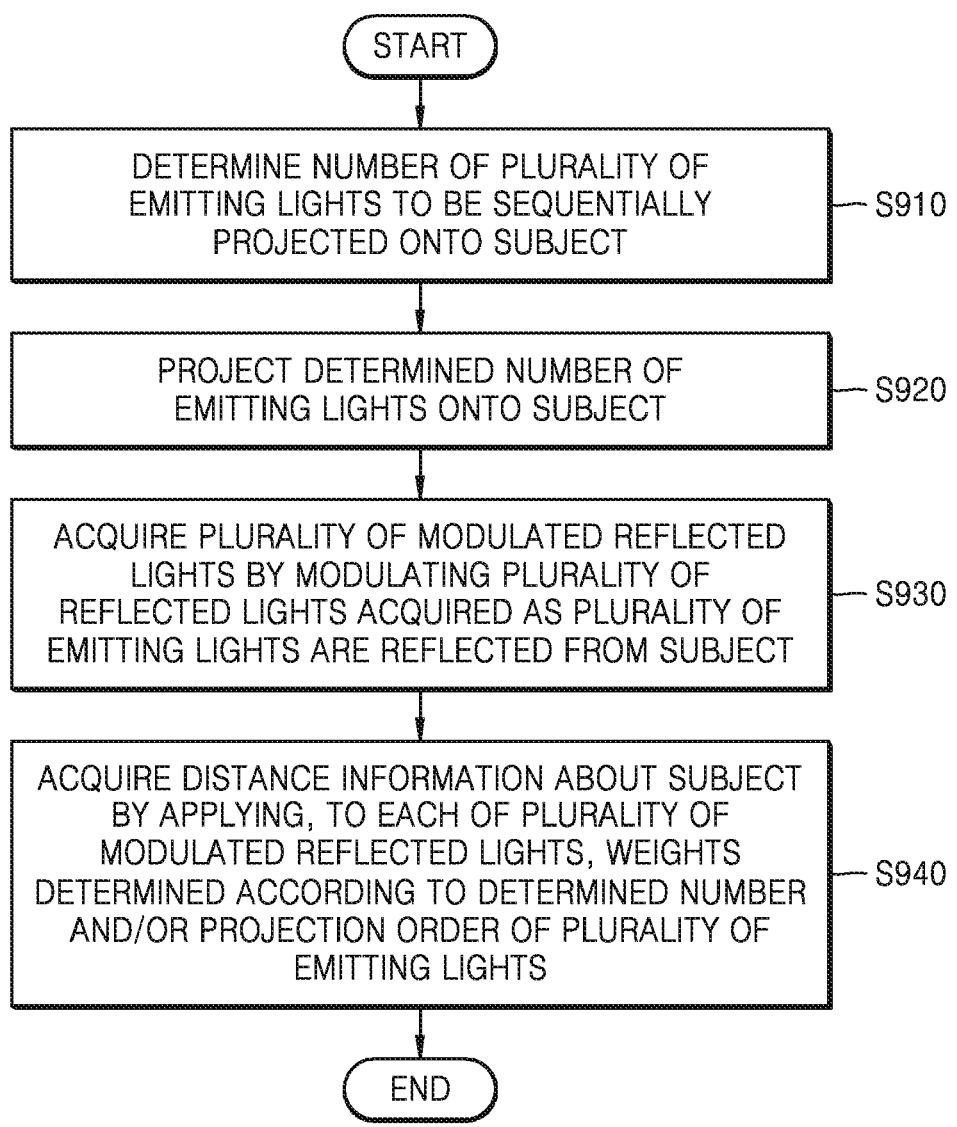
FIG. 9 is a flowchart of a method of acquiring, by a device, distance information about a subject by projecting a plurality of emitting lights onto the subject, according to an exemplary embodiment.

FIG. 9 is a flowchart of a method of acquiring, by the device 100, distance information about a subject by projecting a plurality of emitting lights onto the subject, according to an exemplary embodiment.

In operation S910, the device 100 according to an exemplary embodiment determines the number of a plurality of emitting lights to be sequentially projected onto a subject. The device 100 may determine the number of emitting lights to be projected based on at least one of a type of noise to be filtered, a projection order, and an allowable error range. For example, the device 100 may determine the number of emitting lights to be one of six to ten based on the type of noise to be filtered and the projection order of the emitting lights. For example, when the type of noise to be filtered is linear function noise, the device 100 may determine the number of emitting lights to be one of six to eight. As another example, when the type of noise to be filtered is quadratic function noise, the device 100 may determine the number of emitting lights to be one of eight to ten.

In operation S920, the device 100 projects the number of emitting lights determined in operation S910 onto the subject.

For example, when the number determined in operation S910 is six, the device 100 may sequentially project the six emitting lights onto the subject.

The device 100 may repeatedly project the number of emitting lights determined in operation S910 by using the determined number as one unit during projection processes. For example, when the number determined in operation S910 is seven, projection processes of projecting first through seventh emitting lights onto the subject, and then projecting the first through seventh emitting lights onto the subject again may be repeated. In this case, the device 100 may acquire distance information about the subject by using information acquired from the first through seventh emitting lights. For example, the distance information about the subject may be determined by using information acquired from the emitting light that has been projected first, and then the determined distance information may be updated by using information acquired from the emitting light that has been projected second.

One of the plurality of emitting lights projected by the device 100 according to an exemplary embodiment may be one of a plurality of periodic waves in which periods are the same and at least one of amplitudes and phases are different.

For example, when the device 100 projects N emitting lights onto the subject, the first through $N^{th}$ emitting lights may be periodic waves in which periods, waveforms, and amplitudes are the same and phases are different. For example, a phase difference of 90×N° may exist between a plurality of emitting lights, wherein N is a natural number. In this case, a $K^{th}$ emitting light and a $K+4^{th}$ emitting lights may have the same periods, waveforms, amplitudes, and phase. For example, a phase of the $K^{th}$ emitting light may be slower than a phase of a $K+1^{th}$ emitting light by 90°, the phase of the $K+1^{th}$ emitting light may be slower than a phase of a $K+2^{th}$ emitting light by 90°, the phase of the $K+2^{th}$ emitting light may be slower than a phase of a $K+3^{th}$ emitting light by 90°, and the phase of the $K+3^{th}$ emitting light may be slower than the phase of the $K+4^{th}$ emitting light by 90°. Also, the $K^{th}$ emitting light and the $K+4^{th}$ emitting light may have the same periods, waveforms, amplitudes, and phases. Here, the term "same" is not limitedly interpreted as being realized in the real world to be physically identical, and may mean a sameness within a realistic error range.

In operation S930, the device 100 according to an exemplary embodiment acquires a plurality of modulated reflected lights by modulating one or more reflected lights acquired as the plurality of emitting lights sequentially projected in operation S920 are reflected from the subject.

For example, the device 100 may acquire the modulated reflected lights or phase images by mixing the reflected lights by using a modulating signal having a gain waveform.

Modulation according to an exemplary embodiment may include light modulation. Also, a modulating signal used by the device 100 to modulate one or more reflected lights may include periodic waves having the same period as one or more emitting lights to be modulated.

In operation S940, the device 100 according to an exemplary embodiment acquires the distance information about the subject by applying, to each of the plurality of modulated reflected lights acquired in operation S930, a weight determined according to the number determined in operation S910 and/or the projection order of the emitting lights.

The device 100 according to an exemplary embodiment may acquire the distance information about the subject by applying, to each of the plurality of modulated reflected lights acquired in operation S930, the weight determined according to the number determined in operation S910. For example, when the number determined in operation S910 is six and six intensity images I1 through I6 are acquired according to first through sixth emitting lights that are sequentially projected, the device 100 may apply a weight of ½ to the intensity images I1, I5, I2, and I6, and apply a weight of 1 to the intensity images I3 and I4. In this case, the device 100 may acquire MBI and a φ by applying the weight of ½ to the intensity images I1, I5, I2, and I6, and applying the weight of 1 to the intensity images I3 and I4, and then acquire the distance information about the subject by using the acquired MBI and φ. A method of acquiring distance information according to applying of a weight will be described in detail later with reference to FIG. 17. Here, φ may denote a phase difference according to TOF.

Figure 17:
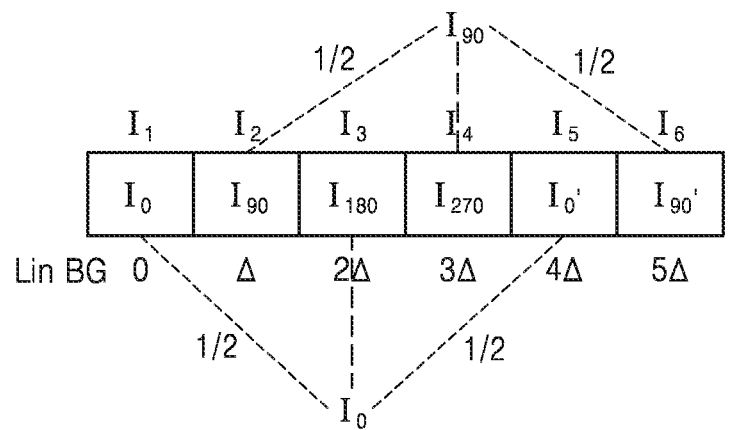
FIG. 17 illustrates an example of a device projecting six emitting lights in a repeated projection order of 0°, 90°, 180°, and 270° to acquire distance information in which an error generated due to linear function noise is reduced, according to an exemplary embodiment.

The method of acquiring distance information according to applying of a weight, which will be described later with reference to FIG. 17, is only an example and thus does not limit the scope of the present disclosure. Any method of acquiring distance information about a subject by applying a weight to an intensity image, a reflected light, or a modulated reflected light according to a weight applying method pre-determined based on the number of emitting lights and/or a projection order of the emitting lights may be used.

Figure 10:
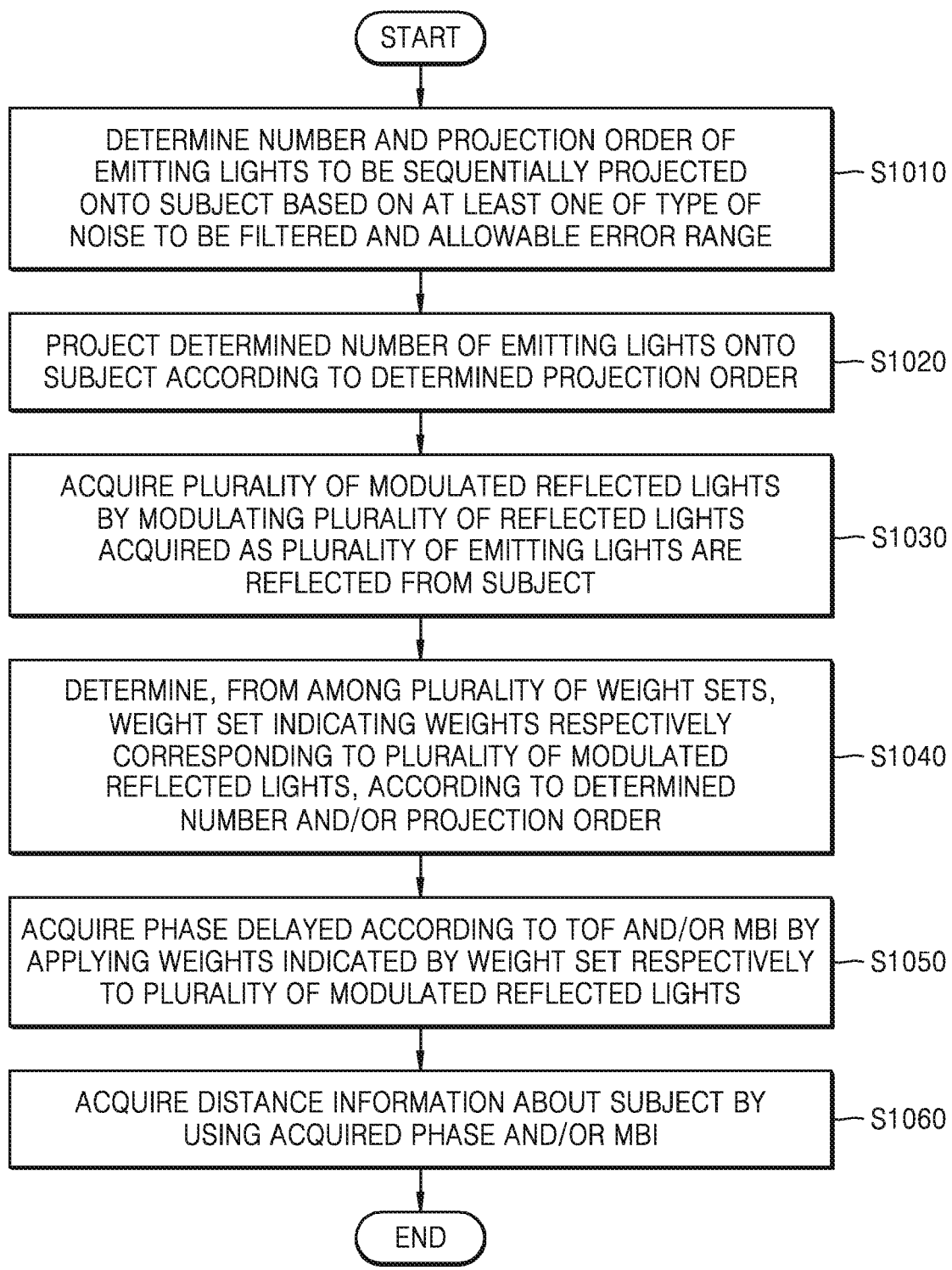
FIG. 10 is a flowchart of a method of acquiring, by a device, distance information about a subject by determining the number of emitting lights to be projected and a projection order, and projecting the determined number of emitting lights in the determined projection order, according to an exemplary embodiment.

FIG. 10 is a flowchart of a method of acquiring, by the device 100, distance information about a subject by determining the number of emitting lights to be projected and a projection order, and projecting the determined number of emitting lights in the determined projection order, according to an exemplary embodiment.

In operation S1010, the device 100 according to an exemplary embodiment determines the number and a projection order of emitting lights to be sequentially projected onto a subject based on at least one of a type of noise to be filtered and an allowable error range.

A method of determining the number of emitting lights has been described above with reference to operation S910.

The device 100 according to an exemplary embodiment may determine the number and projection order of the emitting lights to be projected onto the subject based on the type of noise to be filtered.

For example, when the type of noise to be filtered is linear function noise, the device 100 may use one of methods of projecting six emitting lights in a repeated projection order of 0°, 90°, 180°, and 270° as will be described later in relation to FIG. 17, projecting seven lights in a repeated projection order of 0°, 90°, 180°, and 270° as will be described later in relation to FIG. 18, projecting six emitting lights in a repeated projection order of 0°, 180°, 90°, and 270° as will be described later in relation to FIG. 20, and projecting eight emitting lights in a repeated projection order of 0°, 180°, 90°, and 270° as will be described later in relation to FIG. 22.

As another example, when the type of noise to be filtered is quadratic function noise, the device 100 may use one of methods of projecting eight emitting lights in a repeated projection order of 0°, 90°, 180°, and 270° as will be described later in relation to FIG. 23, and projecting ten emitting lights in a repeated projection order of 0°, 180°, 90°, and 270° as will be described later in relation to FIG. 24.

As another example, when the type of noise to be filtered is discontinuous noise, the device 100 may project the pre-set number of emitting lights in a projection order of 0°, 180°, 90°, and 270°. The projecting of emitting lights in the projection order of 0°, 180°, 90°, and 270° will be described later with reference to FIGS. 19 and 21.

However, an exemplary embodiment is not limited thereto, and any method of determining the number and projection order of emitting lights to be projected onto a subject based on a type of noise to be filtered may be used.

The device 100 according to an exemplary embodiment may determine the number and projection order of the emitting lights to be projected onto the subject based on the allowable error range.

For example, the device 100 may determine the number of emitting lights to be high when the allowable error range is low.

For example, when an error of a value of φ caused by linear function noise is not allowed, the device 100 may determine the number of emitting lights to be at least six. As another example, when an error of a value of MBI caused by linear function noise is not allowed, the device 100 may determine the number of emitting lights to be at least seven.

In operation S1020, the device 100 according to an exemplary embodiment projects the number of emitting lights determined in operation S1010 onto the subject according to the projection order determined in operation S1010.

A method of projecting a plurality of emitting lights onto a subject has been described above with reference to operation S920.

In operation S1030, the device 100 acquires a plurality of modulated reflected lights by modulating a plurality of reflected lights acquired as the emitting lights projected in operation S1020 are reflected from the subject.

Since operation S1030 corresponds to operation S930, details thereof are not provided again.

In operation S1040, the device 100 determines, from among a plurality of weight sets, a weight set indicating weights respectively corresponding to the plurality of modulated reflected lights, according to the number and/or projection order determined in operation S1010.

For example, when the number and repeated projection order of the emitting lights determined in operation S1010 are respectively six, and 0°, 90°, 180°, and 270°, the device 100 may determine a first weight set from among first through $N^{th}$ weight sets as a weight set used to acquire distance information. Here, the first weight set may indicate that weights of ½, ½, 1, 1, ½, and ½ are applied respectively to the intensity images I1 through I6. As another example, when the number and repeated projection order of the emitting lights determined on operation S1010 are respectively eight, and 0°, 180°, 90°, and 270°, the device 100 may determine the fourth weight set from among the first through $N^{th}$ weight sets as a weight set used to acquire distance information. Here, the fourth weight set may indicate that weights of ⅛, ⅜, ⅝, ⅛, ⅝, ⅜, and ⅛ are applied respectively to the intensity images I2 through I9.

In operation S1050, the device 100 acquires a phase $\phi$ delayed according to TOF and/or MBI by applying the weights indicated by the weight set determined in operation S1040 respectively to the plurality of modulated reflected lights or respectively to a plurality of intensity images acquired by using the plurality of modulated reflected lights.

An exemplary embodiment of acquiring MBI and/or $\phi$ by applying a weight will be described later with reference to FIG. 17.

In operation S1060, the device 100 according to an exemplary embodiment acquires distance information about the subject by using the phase $\phi$ and/or MBI acquired in operation S1050.

For example, the device 100 may determine a distance corresponding to a value of the phase $\phi$ acquired in operation S1050 as a distance from a light source to the subject.

As another example, the device 100 may use MBI acquired in operation S1050 to acquire the distance information. The device 100 may determine whether to use the distance information acquired according to MBI acquired in operation S1050. For example, the device 100 may determine a distance of the subject by excluding the distance information acquired when MBI acquired in operation S1050 is higher than a threshold value and only using the distance information acquired when MBI acquired in operation S1050 is lower than the threshold value. In this case, the device 100 may supplement the excluded distance information with the distance information acquired when MBI acquired in operation S1050 is lower than the threshold value by using, for example, an interpolation method.

Figure 11:
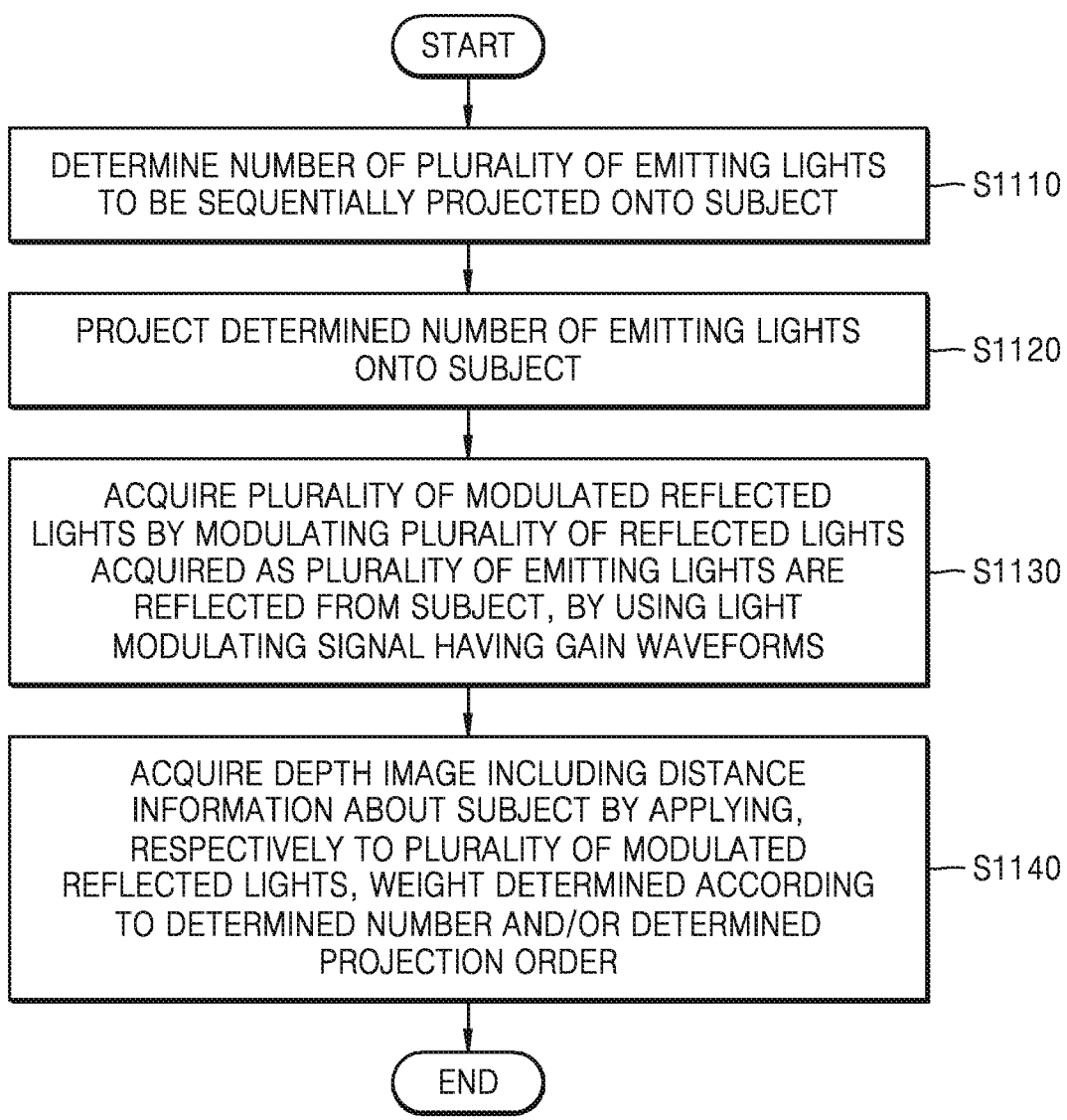
FIG. 11 is a flowchart of a method of acquiring, by a device, a depth image including distance information about a subject, by using a weight, according to an exemplary embodiment.

FIG. 11 is a flowchart of a method of acquiring, by the device 100, a depth image including distance information about a subject, by using a weight, according to an exemplary embodiment.

Since operations S1110 through S1130 respectively correspond to operations S910 through S930, details thereof are not provided again.

In operation S1140, the device 100 according to an exemplary embodiment acquires a depth image including the distance information about the subject by applying, respectively to the plurality of modulated reflected lights, weights determined according to the determined number and/or the determined projection order.

The device 100 may acquire a phase $\phi$ delayed according to TOF and/or MBI by applying a weight to the modulated reflected light acquired in operation S1130 or an intensity image, and acquire the depth image including the distance information by using the acquired $\phi$ and/or MBI.

Figure 12:
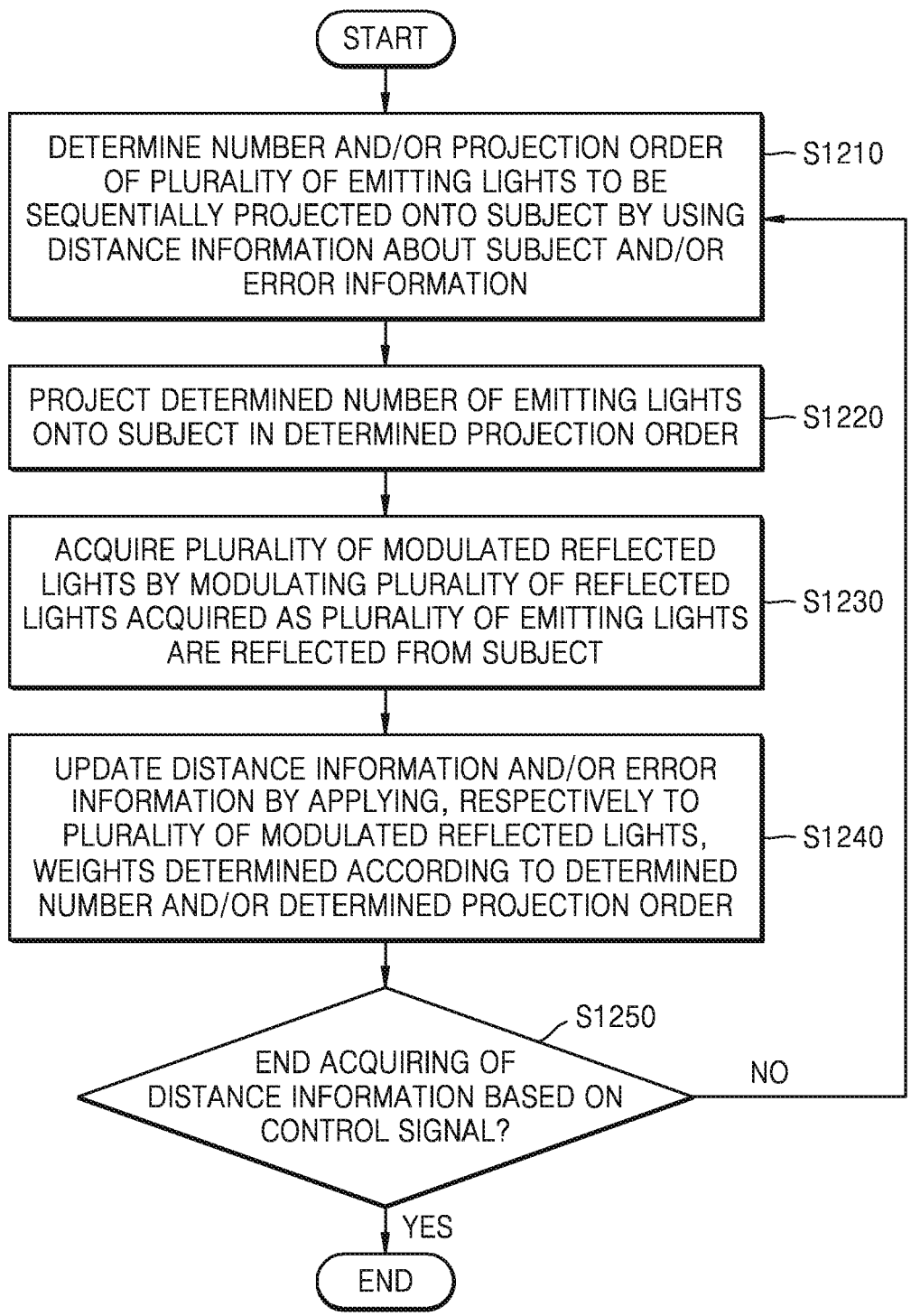
FIG. 12 is a flowchart of a method of determining the number of emitting lights to be projected onto a subject and/or a projection order by using distance information about the subject and/or error information, and updating the distance information and/or the error information by using the determined number of emitting lights and the emitting lights projected in the determined projection order, according to an exemplary embodiment.

FIG. 12 is a flowchart of a method of determining the number of emitting lights to be projected onto a subject and/or a projection order by using distance information about the subject and/or error information, and updating the distance information and/or the error information by using the determined number of emitting lights and the emitting lights projected in the determined projection order, according to an exemplary embodiment.

In operation S1210, the device 100 according to an exemplary embodiment determines the number and/or projection order of a plurality of emitting lights to be sequentially projected onto a subject by using distance information about a subject and/or error information.

When there are the acquired distance information and/or error information, the device 100 may determine the number and/or projection order of the emitting lights to be projected according to the acquired distance information and/or error information. For example, the number and projection order of the emitting lights may be determined based on a value of $\phi$ or MBI that is pre-acquired. For example, when the value of acquired MBI is equal to or higher than a threshold value, the device 100 may determine the number of emitting lights to be projected to be higher than the number of emitting lights that has been projected. For example, when the value of acquired MBI is equal to or higher than the threshold value, the device 100 may determine that a probability of a high TOF distance error is high. In this case, in order to reduce an uncertain region, the device 100 may update the number and/or projection order of the emitting lights. For example, when the value of acquired MBI is determined to be equal to or higher than the threshold value, the device 100 may change the projection order of the emitting lights and/or increase the number of emitting lights to be projected onto the subject. In the present exemplary embodiment, the projection order is not limited to a projection order of 0°, 90°, 180°, and 270° or to a projection order of 0°, 180°, 90°, and 270°. For example, the projection order may include a projection order of 180°, 0°, 90°, and 270° or a projection order of 0°, 270°, 90°, and 180°. As another example, when an error caused by the value of the pre-acquired $\phi$ is determined to be equal to or higher than a threshold value, the device 100 may determine the number of emitting lights to be projected to be higher than the number of emitting lights that has been projected.

Since operations S1220 and S1230 respectively correspond to operations S1020 and S1030, details thereof are not provided again.

In operation S1240, the device 100 updates the distance information and/or the error information by applying, respectively to the plurality of modulated reflected lights, weights determined according to the determined number and/or the determined projection order.

Operations S1240 may be performed according to operations S940, S1050, and S1060.

The device 100 may acquire the distance information and/or the error information by using the modulated reflected lights acquired in operation S1230 or intensity images, and update the distance information and/or the error information based on newly acquired information.

In operation S1250, the device 100 determines whether to end the acquiring of the distance information based on a control signal.

When it is determined to maintain the acquiring of the distance information in operation S1250, the device 100 may repeat operations S1210 through S1240. The device 100 may repeat operations S1210 through S1240 according to the control signal.

Figure 13:
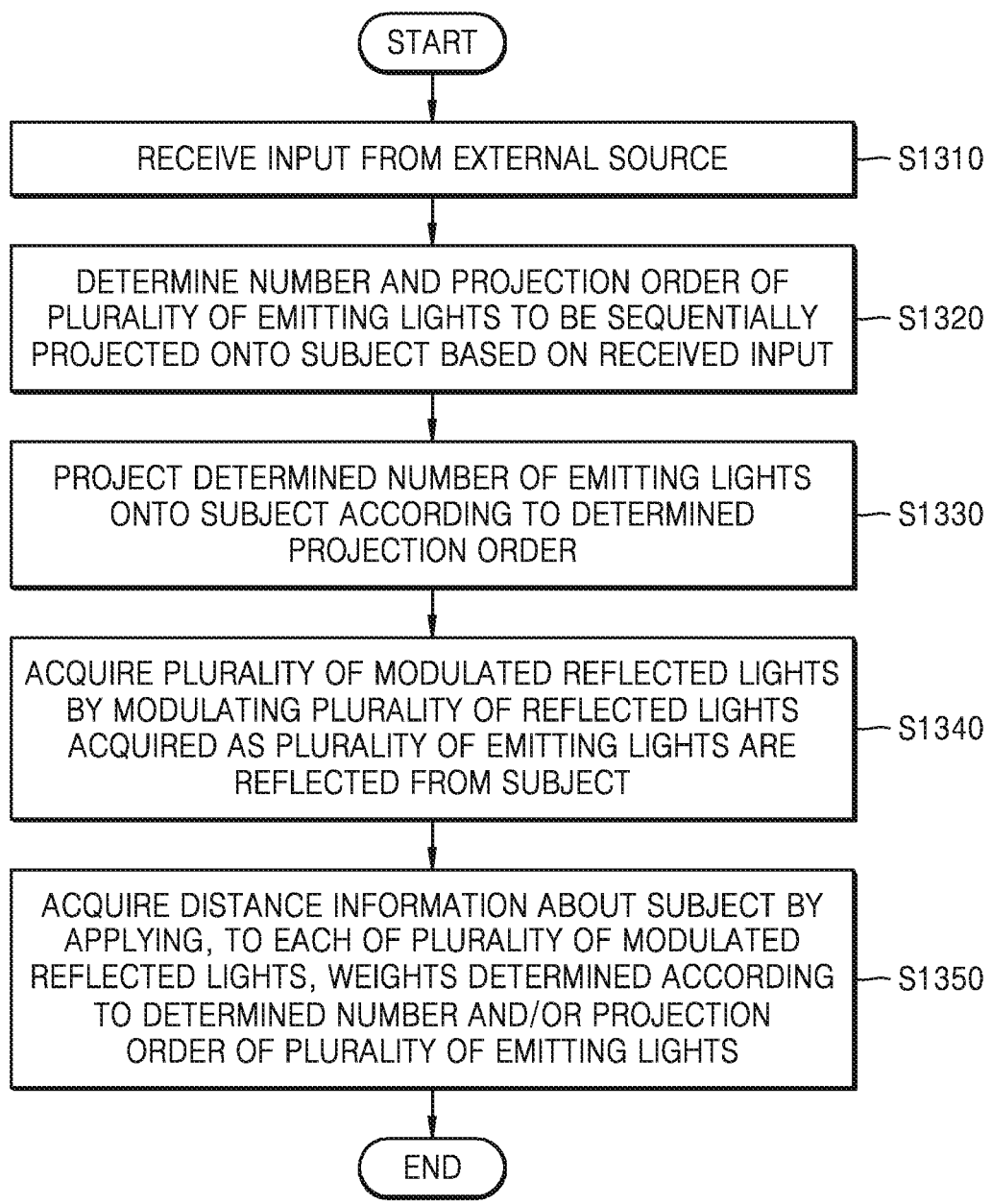
FIG. 13 is a flowchart of a method of determining the number of emitting lights to be projected onto a subject according to an input received from an external source and/or a projection order, and acquiring distance information about the subject by using the determined number of emitting lights and the emitting lights projected in the determined projection order, according to an exemplary embodiment.

FIG. 13 is a flowchart of a method of determining the number of emitting lights to be projected onto a subject according to an input received from an external source and/or a projection order, and acquiring distance information about the subject by using the determined number of emitting lights and the emitting lights projected in the determined projection order, according to an exemplary embodiment.

In operation S1310, the device 100 according to an exemplary embodiment may receive an input from an external source. For example, the device 100 may receive an input regarding target accuracy, the number of emitting lights to be projected, and a projection order of the emitting lights to be projected. The input received in operation S1310 may be based on a user input or a control signal received from an external device.

In operation S1320, the device 100 determines the number and projection order of a plurality of emitting lights to be sequentially projected onto a subject based on the received input.

The device 100 may determine a projection method of the emitting lights based on the input received in operation S1310.

For example, the device 100 may project eight emitting lights in a repeated projection order of 0°, 90°, 180°, and 270° based on the input received in operation S1310. As another example, the device 100 may project a total of six emitting lights six times by projecting one emitting light at a time, in a repeated projection order of 0°, 180°, 90°, and 270°, based on the input received in operation S1310.

Also, the device 100 may determine one of a plurality of pre-set projection orders to be the projection order of the emitting lights based on the input.

Since operations S1330 through S1350 respectively correspond to operations S1020, S1030, and S940, details thereof are not provided again.

Figure 15:
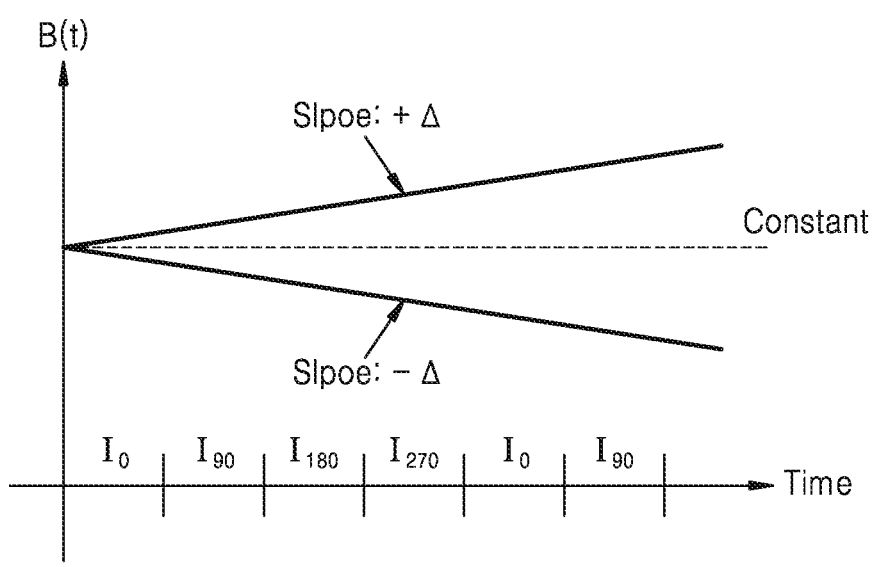
FIG. 15 illustrates examples of linear function noise from among types of noise to be filtered by a device, according to an exemplary embodiment.
Figure 16:
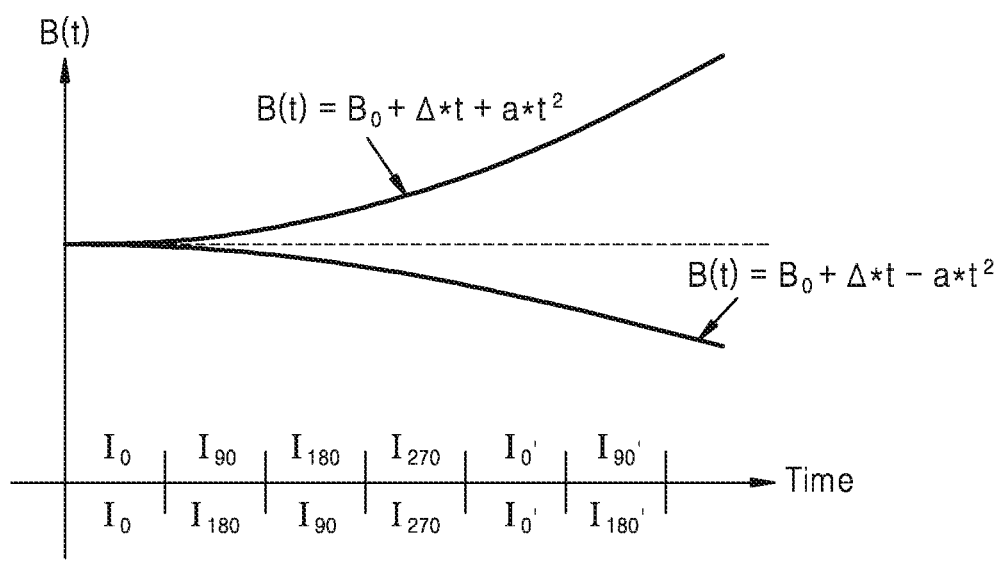
FIG. 16 illustrates examples of quadratic function noise from among types of noise to be filtered by a device, according to an exemplary embodiment.

FIGS. 14 through 16 illustrate types of noise, for example, discontinuous noise, linear function noise, and quadratic function noise. Noise may be generated due to imbalance of reflectance of a surface of a subject, a change of natural light, movement of the subject, or movement of the device 100 projecting an emitting light. For example, in the device 100 accompanying movement, such as a moving robot, noise may be generated due to movement of a light source according to movement of the device 100.

FIG. 14 illustrates examples of discontinuous noise from among types of noise to be filtered by the device 100, according to an exemplary embodiment.

The discontinuous noise may include noise that is generated unpredictably, such as non-periodic noise. Types of the discontinuous noise may vary. Examples of the discontinuous noise include stepwise noise 1410, ramp type noise 1420, and roof type noise 1430.

FIG. 15 illustrates examples of linear function noise from among types of noise to be filtered by the device 100, according to an exemplary embodiment.

The linear function noise may include noise that changes uniformly with the lapse of time. For example, the linear function noise may linearly increase or decrease with the lapse of time. The change with the lapse of time may be generated simultaneously or individually on amplitude A or brightness B of a phase image.

The device 100 according to an exemplary embodiment may use the brightness B to acquire distance information. In this case, a value of the brightness B may linearly change with the lapse of time according to the linear function noise.

FIG. 16 illustrates examples of quadratic function noise from among types of noise to be filtered by the device 100, according to an exemplary embodiment.

The quadratic function noise may include noise in a form represented by a quadratic function. For example, the quadratic function noise may include noise having a positive highest order coefficient or a negative highest order coefficient. The change with the lapse of time may be generated simultaneously or individually on amplitude A or brightness B of a phase image.

The device 100 according to an exemplary embodiment may use the brightness B to acquire distance information. In this case, a value of the brightness B may change according to a quadratic function with the lapse of time according to the quadratic function noise.

FIG. 17 illustrates an example of the device 100 projecting six emitting lights in a repeated projection order of 0°, 90°, 180°, and 270° to acquire distance information in which an error generated due to linear function noise is reduced, according to an exemplary embodiment.

The device 100 according to an exemplary embodiment may acquire the intensity images I1 through I6 by projecting the six emitting lights in the repeated projection order of 0°, 90°, 180°, and 270°. Also, the linear function noise affects the intensity images I1 through I6 respectively by 0, $\Delta$, $2\Delta$, $3\Delta$, $4\Delta$, and $5\Delta$.

Accordingly, when MBI and $\phi$ are calculated by applying a weight of ½ to the intensity images I1, I2, I5, and I6 and a weight of 1 to the intensity images I3 and I4, an error of $\Delta$ may be generated in MBI due to the linear function noise. Although an error is not generated in $\phi$ with respect to the linear function noise of brightness B, an error may be generated due to an effect of a change of amplitude A with respect to noise of amplitude A or brightness B in a form of a linear function.

Accordingly, the device 100 acquires distance information by projecting the six emitting lights in the repeated projection order of 0°, 90°, 180°, and 270°, thereby removing or reducing an error generated due to the linear function noise. For example, when the distance information is acquired as shown in FIG. 17, an error generated due to linear function noise may be reduced compared to when four or five emitting lights are used.

Figure 18:
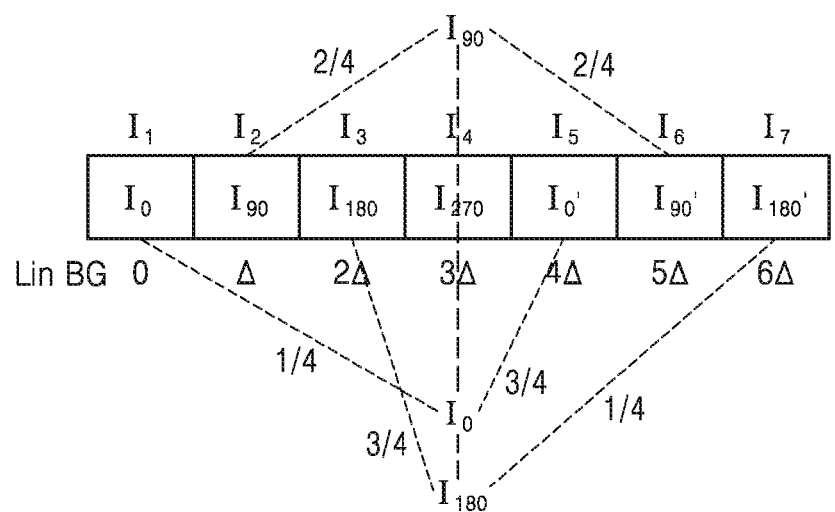
FIG. 18 illustrates an example of a device projecting seven emitting lights in a repeated projection order of 0°, 90°, 180°, and 270° to acquire distance information in which an error generated due to linear function noise is reduced, according to an exemplary embodiment.

FIG. 18 illustrates an example of the device 100 projecting seven emitting lights in a repeated projection order of 0°, 90°, 180°, and 270° to acquire distance information in which an error generated due to linear function noise is reduced, according to an exemplary embodiment.

The device 100 according to an exemplary embodiment may acquire the intensity images I1 through I7 by projecting the seven emitting lights in the projection order of 0°, 90°, 180°, and 270°. Also, the linear function noise affects the intensity images I1 through I7 respectively by 0, Δ, 2Δ, 3Δ, 4Δ, 5Δ, and 6 Δ.

Accordingly, when MBI and φ are calculated by applying a weight of ½ to the intensity images I2 and I6, a weight of ¼ to the intensity images I1 and I7, a weight of ¾ to the intensity images I3 and I5, and a weight of 1 to the intensity image I4, an error generated due to noise of amplitude A or brightness B in a form of a linear function is not generated in both MBI and φ. This is because simultaneity compensation has been performed on time by the weight based on 270° at the center.

Accordingly, the device 100 acquires distance information by projecting the seven emitting lights in the repeated projection order of 0°, 90°, 180°, and 270°, thereby removing or reducing an error generated due to the linear function noise. For example, when the distance information is acquired as shown in FIG. 18, an error generated due to linear function noise may be reduced compared to when four through six emitting lights are used.

FIG. 19 illustrates examples of the device 100 projecting emitting lights in a projection order of 0°, 180°, 90°, and 270° to acquire distance information in which an error generated due to discontinuous noise is reduced, according to an exemplary embodiment.

In a first case 1910, the emitting lights are projected in a projection order of 0°, 90°, 180°, and 270°. In the first case 1910, an error due to generation of discontinuous noise is generated when errors Δ having different signs are added to a numerator and a denominator of φ.

In a second case 1920, the emitting lights are projected in the projection order of 0°, 180°, 90°, and 270°. In the second case 1920, unlike the first case 1910, an error due to generation of discontinuous noise is not generated in φ.

Accordingly, a projection order of emitting lights may affect a degree of error according to a type of noise and a point of time when the noise is generated, and the device 100 may reduce an error by determining a projection order of emitting lights according to the type of noise and the point of time when the noise is generated.

Figure 20:
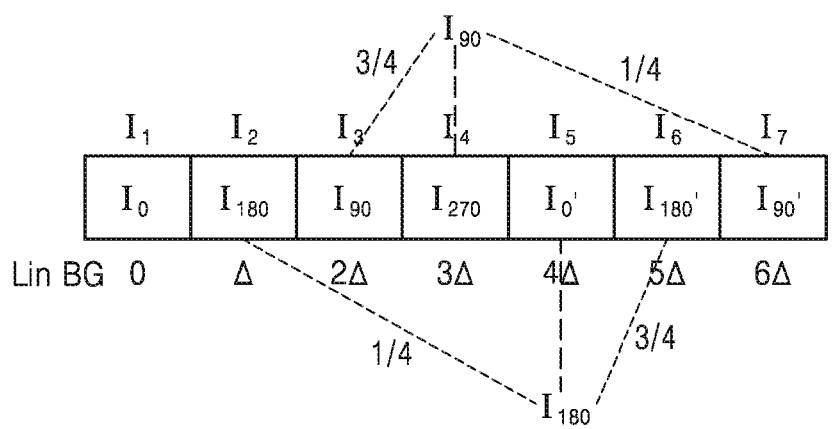
FIG. 20 illustrates an example of a device projecting six emitting lights in a repeated projection order of 0°, 180°, 90°, and 270° to acquire distance information in which an error generated due to linear function noise is reduced, according to an exemplary embodiment.

FIG. 20 illustrates an example of the device 100 projecting six emitting lights in a repeated projection order of 0°, 180°, 90°, and 270° to acquire distance information in which an error generated due to linear function noise is reduced, according to an exemplary embodiment.

The device 100 according to an exemplary embodiment may acquire intensity images I2 through I7 by projecting the six emitting lights in the repeated projection order of 0°, 180°, 90°, and 270°. Also, the linear function noise affects the intensity images I2 through I7 respectively by Δ, 2Δ, 3Δ, 4Δ, 5Δ, and 6Δ.

Accordingly, when MBI and φ are calculated by applying a weight of ¼ to the intensity images I2 and I7, a weight of ¾ to the intensity images I3 and I6, and a weight of 1 to the intensity images I4 and I5, an error of −Δ is generated in MBI due to the linear function noise, and although an error is not generated in φ with respect to the linear function noise of brightness B, an error is generated due to an effect of a change of amplitude A with respect to noise of amplitude A or brightness B in a form of a linear function.

Thus, the device 100 according to an exemplary embodiment may reduce or remove an error caused by the linear function noise by projecting the six emitting lights in the repeated projection order of 0°, 180°, 90°, and 270° to acquire distance information. For example, when distance information is acquired as shown in FIG. 20, an error caused by linear function noise may be reduced compared to when four or five emitting lights are used or when six emitting lights are projected in a projection order of 0°, 90°, 180°, and 270° to acquire distance information.

FIG. 21 illustrates an example of the device 100 projecting six emitting lights in a repeated projection order of 0°, 180°, 90°, and 270° to acquire distance information in which an error generated due to discontinuous noise is reduced, according to an exemplary embodiment.

A first noise graph 2110 illustrates an example of stepwise noise. Also, an error according to a point of time when stepwise noise is generated is illustrated in a first error graph 2120. It is checked in the first error graph 2120 that an error generated when six emitting lights are projected in a repeated projection order of 0°, 180°, 90°, and 270° is generally smaller than an error generated when six emitting lights are projected in a repeated projection order of 0°, 90°, 180°, and 270°, except for some cases.

A second noise graph 2130 illustrates an example of roof type noise. Also, an error according to a point of time when roof type noise is generated is illustrated in a second error graph 2140. In this case as well, it is checked in the second error graph 2140 that an error generated when six emitting lights are projected in a repeated projection order of 0°, 180°, 90°, and 270° is smaller than an error generated when six emitting lights are projected in a repeated projection order of 0°, 90°, 180°, and 270° throughout tests.

Equations for calculating phases when a projection order is 0°, 90°, 180°, and 270° and when a projection order is 0°, 180°, 90°, and 270° are shown in Equations 2150.

Figure 22:
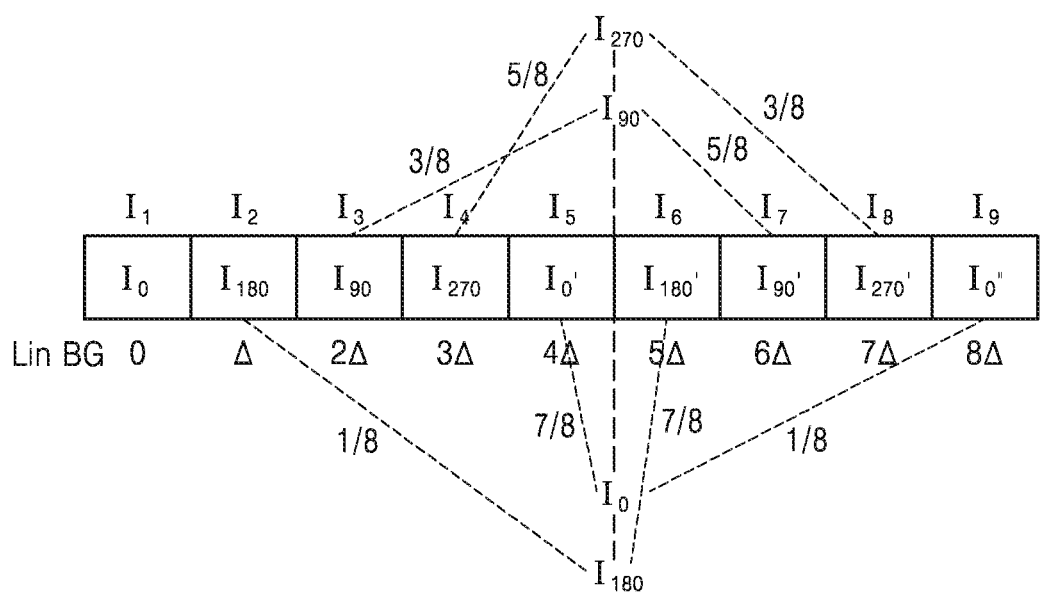
FIG. 22 illustrates an example of a device projecting eight emitting lights in a repeated projection order of 0°, 180°, 90°, and 270° to acquire distance information in which an error generated due to linear function noise is reduced, according to an exemplary embodiment.

FIG. 22 illustrates an example of the device 100 projecting eight emitting lights in a repeated projection order of 0°, 180°, 90°, and 270° to acquire distance information in which an error generated due to linear function noise is reduced, according to an exemplary embodiment.

The device 100 according to an exemplary embodiment may acquire intensity images I2 through I9 by projecting the eight emitting lights in the repeated projection order of 0°, 180°, 90°, and 270°. Also, the linear function noise affects the intensity images I2 through I9 respectively by Δ, 2Δ, 3Δ, 4Δ, 5Δ, 6Δ, 7Δ, and 8Δ.

Accordingly, when MBI and φ are calculated by applying a weight of ⅛ to the intensity images I2 and I9, a weight of ⅜ to the intensity images I3 and I8, a weight of ⅝ to the intensity images I4 and I7, and a weight of ⅞ to the intensity images I5 and I6, an error caused by noise of amplitude A and brightness B in a form of a linear function is not generated both in MBI and φ, because simultaneity compensation is performed on time according to a weight based on a viewpoint between 0° and 180° at the center.

Thus, the device 100 may reduce or remove an error caused by the linear function noise by projecting the eight emitting lights in the repeated projection order of 0°, 180°, 90°, and 270° to acquire distance information. For example, when distance information is acquired as shown in FIG. 22, an error caused by linear function noise may be reduced compared to when four through seven emitting lights are used. For example, when the distance information is acquired as shown in FIG. 22, an error caused by linear function noise may be reduced compared to when eight emitting lights are projected in a repeated projection order of 0°, 90°, 180°, and 270° to acquire distance information.

Figure 23:
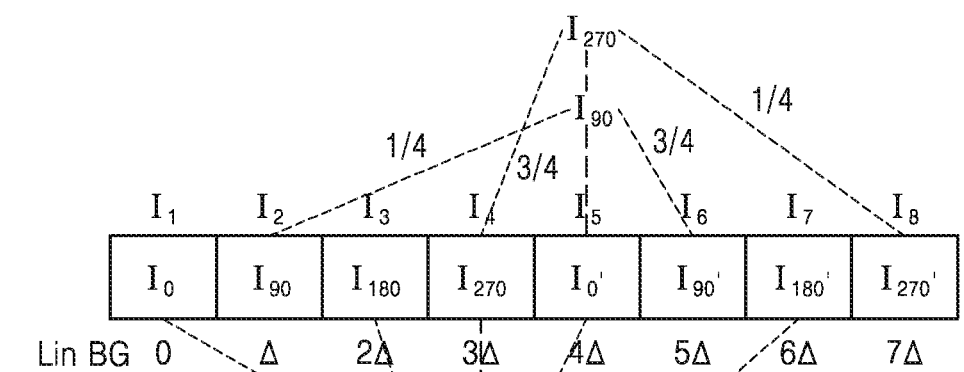
FIG. 23 illustrates an example of a device projecting eight emitting lights in a repeated projection order of 0°, 90°, 180°, and 270° to acquire distance information in which an error generated due to linear function noise and quadratic function noise is reduced, according to an exemplary embodiment.

FIG. 23 illustrates an example of the device 100 projecting eight emitting lights in a repeated projection order of 0°, 90°, 180°, and 270° to acquire distance information in which an error generated due to linear function noise and quadratic function noise is reduced, according to an exemplary embodiment.

The device 100 may acquire intensity images I1 through I8 by projecting the eight emitting lights in the projection order of 0°, 90°, 180°, and 270°. Also, the linear function noise affects the intensity images I1 through I8 respectively by 0, Δ, 2Δ, 3Δ, 4Δ, 5Δ, 6Δ, and 7Δ, and the quadratic function noise affects the intensity images I1 through I8 respectively by 0, a, 4a, 9a, 16a, 25a, 36a, and 49a.

Accordingly, when MBI and φ are calculated by applying a weight of ¼ to the intensity images I1, I2, I7, and I8 and a weight of ¾ to the intensity images I3, I4, I5, and I6, an error of 7a is generated in MBI due to the quadratic function noise and an error is not generated in φ with respect to the linear function noise and the quadratic function noise of brightness B, but an error is generated due to an effect of a change of amplitude A with respect to noise of amplitude A or brightness B in forms of a linear function and a quadratic function.

Thus, the device 100 may reduce or remove an error caused by linear function noise and quadratic function noise by projecting eight emitting lights in a repeated projection order of 0°, 90°, 180°, and 270° to acquire distance information. For example, when distance information is acquired as shown in FIG. 23, an error caused by linear function noise and quadratic function noise may be reduced compared to when four through seven emitting lights are used.

Figure 24:
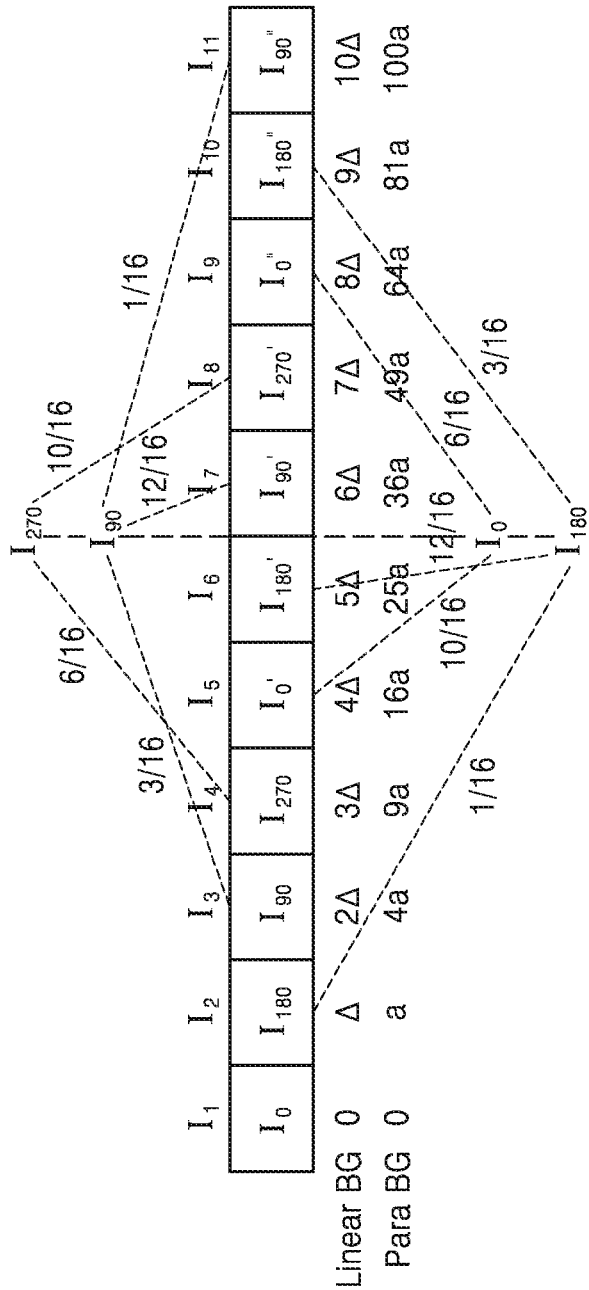
FIG. 24 illustrates an example of a device projecting ten emitting lights in a repeated projection order of 0°, 180°, 90°, and 270° to acquire distance information in which an error generated due to linear function noise and quadratic function noise is reduced, according to an exemplary embodiment.

FIG. 24 illustrates an example of the device 100 projecting ten emitting lights in a repeated projection order of 0°, 180°, 90°, and 270° to acquire distance information in which an error generated due to linear function noise and quadratic function noise is reduced, according to an exemplary embodiment.

The device 100 according to an exemplary embodiment may acquire intensity images I2 through I11 by projecting the ten emitting lights in the repeated projection order of 0°, 180°, 90°, and 270°. Also, the linear function noise affects the intensity images I2 through I11 respectively by Δ, 2Δ, 3Δ, 4Δ, 5Δ, 6Δ, 7Δ, 8Δ, 9Δ, and 10Δ, and the quadratic function noise affects the intensity images I2 through I11 respectively by a, 4a, 9a, 16a, 25a, 36a, 49a, 64a, 81a, and 100a.

Accordingly, when MBI and φ are calculated by applying a weight of 1/16 to the intensity images I2 and I11, a weight of 3/16 to the intensity images of I3 and I10, a weight of 6/16 to the intensity images I4 and I9, a weight of 10/16 to the intensity images of I5 and I8, and a weight of 12/16 to the intensity images I6 and I7, an error caused by noise of amplitude A and brightness B in forms of a linear function and a quadratic function is not generated both in MBI and φ, because simultaneity compensation is performed on time according to a weight based on a viewpoint between 180° and 90° at the center.

Thus, the device 100 may reduce or remove an error caused by linear function noise and quadratic function noise by projecting ten emitting lights in a repeated projection order of 0°, 180°, 90°, and 270° to acquire distance information. For example, when distance information is acquired as shown in FIG. 24, an error caused by linear function noise and quadratic function noise may be reduced compared to when four through nine emitting lights are used.

Figure 25:
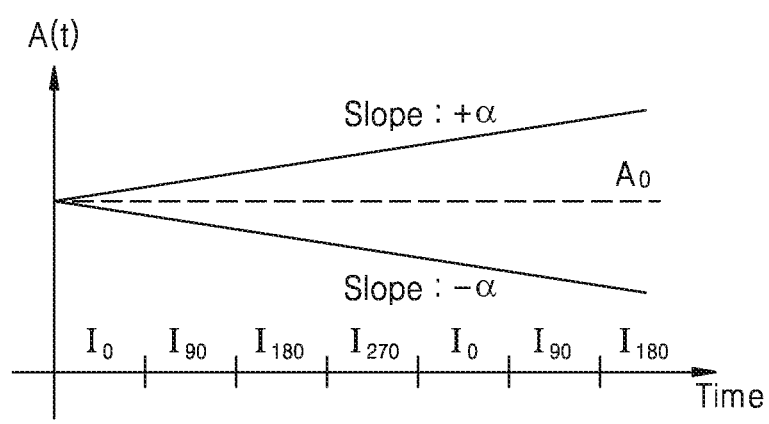
FIG. 25 illustrates an example of linear function noise from among types of noise to be filtered by a device, according to an exemplary embodiment.

FIG. 25 illustrates an example of linear function noise from among types of noise to be filtered by the device 100, according to an exemplary embodiment.

The linear function noise may include noise that uniformly changes with the lapse of time. For example, the linear function noise may linearly increase or decrease with the lapse of time. Such a change may be generated simultaneously or individually in amplitude A and brightness B of a phase image.

The device 100 according to an exemplary embodiment may use the amplitude A to acquire distance information. At this time, a value of the amplitude A may linearly change with the lapse of time, according to the linear function noise.

Figure 26:
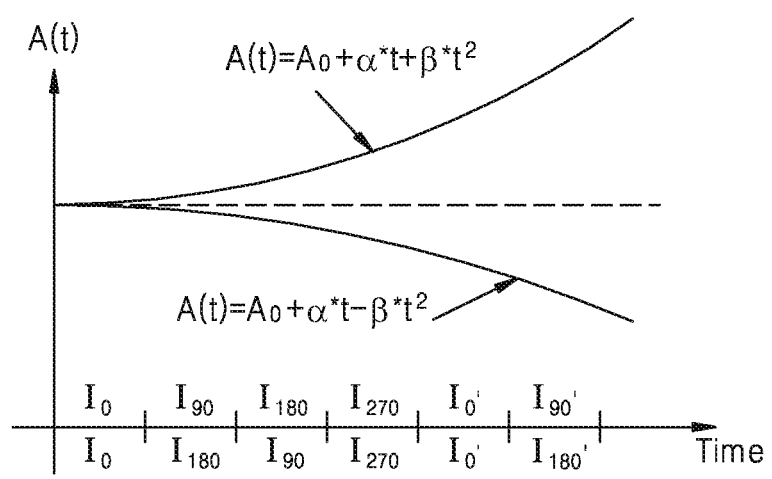
FIG. 26 illustrates an example of quadratic function noise from among types of noise to be filtered by a device, according to an exemplary embodiment.

FIG. 26 illustrates an example of quadratic function noise from among types of noise to be filtered by the device 100, according to an exemplary embodiment.

The quadratic function noise may include noise having a positive highest order coefficient or a negative highest order coefficient. The change with the lapse of time may be generated simultaneously or individually on amplitude A or brightness B of a phase image.

The device 100 according to an exemplary embodiment may use the amplitude A to acquire distance information. In this case, a value of the amplitude B may change with the lapse of time, according to the quadratic function noise.

FIGS. 27 through 32 illustrate examples of a method of acquiring, by the device 100 according to an exemplary embodiment, distance information in consideration of not only noise of brightness B, but also noise of amplitude A. Examples shown in FIGS. 27 through 30 may be based on $A(t)=A0+\alpha*i$, $B(t)=B0+\Delta*i$. Also, examples shown in FIGS. 31 and 32 may be based on $A(t)=A0+\alpha*i+\beta*i^2$ and $B(t)=B0+\Delta*i+\alpha*i^2$.

FIG. 27 illustrates an example of the device 100 acquiring distance information in which an error generated due to a change of amplitude A is reduced, by using six emitting lights in a repeated projection order of 0°, 90°, 180°, and 270°, according to an exemplary embodiment.

Figure 28:
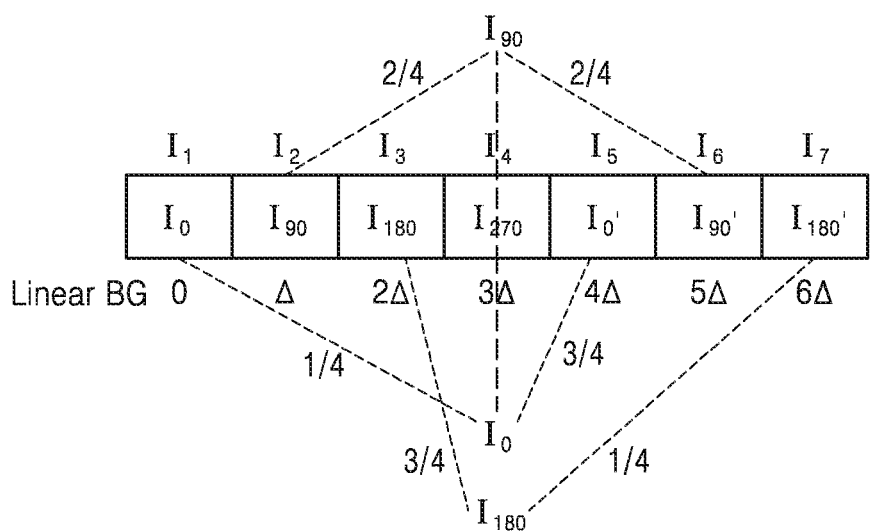
FIG. 28 illustrates an example of a device acquiring distance information in which an error generated due to a change of amplitude is reduced, by using seven emitting lights in a repeated projection order of 0°, 90°, 180°, and 270°, according to an exemplary embodiment.

Also, examples of equations indicating a value of I in FIGS. 27 and 28 are shown at the bottom of FIG. 27.

The device 100 according to an exemplary embodiment may acquire intensity images I1 through I6 by projecting the six emitting lights in the repeated projection order of 0°, 90°, 180°, and 270°. Also, linear function noise affects the intensity images I1 through I6 respectively by 0, Δ, 2Δ, 3Δ, 4Δ, and 5Δ.

Here, the linear function noise may include noise of amplitude A and brightness B.

When MBI and φ are calculated by applying a weight of ½ to the intensity images I1, I2, I5, and I6 and a weight of 1 to the intensity images I3 and I4, an error of Δ may be generated by the linear function noise in MBI. An error may be generated in φ due to a change of amplitude A with respect to noise of amplitude A or brightness B in a form of a linear function.

Accordingly, the device 100 may remove or reduce an error caused by the linear function noise by projecting the six emitting lights in the repeated projection order of 0°, 90°, 180°, and 270° to acquire distance information. For example, when the distance information is acquired as shown in FIG. 27, an error caused by the linear function noise may be reduced compared to when four or five emitting lights are used.

In detail, the device 100 acquires the distance information by projecting the six emitting lights in the repeated projection order of 0°, 90°, 180°, and 270°, thereby reducing an error according to values of amplitude A and brightness B, which linearly change.

FIG. 28 illustrates an example of the device 100 acquiring distance information in which an error generated due to a change of amplitude A is reduced, by using seven emitting lights in a repeated projection order of 0°, 90°, 180°, and 270°, according to an exemplary embodiment.

The device 100 according to an exemplary embodiment may acquire intensity images I1 through I7 by projecting the seven emitting lights in the repeated projection order of 0°, 90°, 180°, and 270°. Also, linear function noise affects the intensity images I1 through I7 respectively by 0, Δ, 2Δ, 3Δ, 4Δ, 5Δ, and 6Δ.

Here, the linear function noise may include noise of amplitude A and brightness B.

When MBI and ϕ are calculated by applying a weight of ½ to the intensity images I2 and I6, a weight of ¼ to the intensity images I1 and I7, a weight of ¾ to the intensity images I3 and I5, and a weight of 1 to the intensity image I4, an error caused by noise of amplitude A and brightness B in a form of a linear function may not be generated in both MBI and ϕ. This is because Accordingly, the device 100 may remove or reduce an error caused by the linear function noise by projecting the six emitting lights in the repeated projection order of 0°, 90°, 180°, and 270° to acquire distance information. For example, when the distance information is acquired as shown in FIG. 27, an error caused by the linear function noise may be reduced compared to when four or five emitting lights are used.

In detail, the device 100 acquires the distance information by projecting the six emitting lights in the repeated projection order of 0°, 90°, 180°, and 270°, thereby reducing an error according to values of amplitude A and brightness B, which linearly change. This is because simultaneity compensation has been performed on time by a weight based on 270° at the center.

Accordingly, the device 100 acquires distance information by projecting the seven emitting lights in the repeated projection order of 0°, 90°, 180°, and 270°, thereby removing or reducing an error generated due to the linear function noise. For example, when the distance information is acquired as shown in FIG. 28, an error generated due to linear function noise may be reduced compared to when four through six emitting lights are used.

In detail, the device 100 according to an exemplary embodiment acquires the distance information by projecting the seven emitting lights in the projection order of 0°, 90°, 180°, and 270°, thereby reducing an error according to values of amplitude A and brightness B, which linearly change.

FIG. 29 illustrates an example of the device 100 acquiring distance information in which an error generated due to a change of amplitude A is reduced, by using six emitting lights in a repeated projection order of 0°, 180°, 90°, and 270°, according to an exemplary embodiment.

Figure 30:
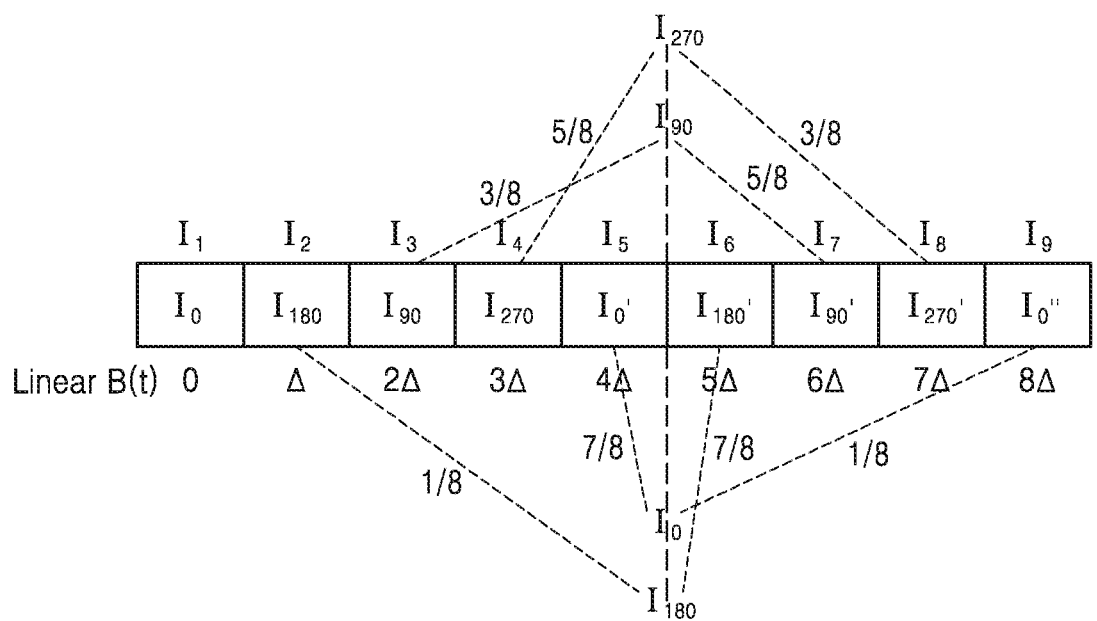
FIG. 30 illustrates an example of a device acquiring distance information in which an error generated due to a change of amplitude is reduced, by using eight emitting lights in a repeated projection order of 0°, 180°, 90°, and 270°, according to an exemplary embodiment.

Examples of equations indicating a value of I in FIGS. 29 and 30 are shown at the bottom of FIG. 29.

The device 100 according to an exemplary embodiment may acquire intensity images I2 through I7 by projecting the six emitting lights in the repeated projection order of 0°, 180°, 90°, and 270°. Also, the linear function noise affects the intensity images I2 through I7 respectively by Δ, 2Δ, 3Δ, 4Δ, 5Δ, and 6Δ.

Here, the linear function noise may include noise of amplitude A and brightness B.

Accordingly, when MBI and ϕ are calculated by applying a weight of ¼ to the intensity images I2 and I7, a weight of ¾ to the intensity images I3 and I6, and a weight of 1 to the intensity images I4 and I5, an error of −Δ is generated in MBI due to the linear function noise, and an error is generated in ϕ due to an effect of a change of amplitude A with respect to noise of amplitude A or brightness B in a form of a linear function.

Thus, the device 100 may reduce or remove an error caused by the linear function noise by projecting the six emitting lights in the repeated projection order of 0°, 180°, 90°, and 270° to acquire distance information. For example, when distance information is acquired as shown in FIG. 29, an error caused by linear function noise may be reduced compared to when four or five emitting lights are used or when six emitting lights are projected in a repeated projection order of 0°, 90°, 180°, and 270° to acquire distance information.

In detail, the device 100 acquires the distance information by projecting the six emitting lights in the projection order of 0°, 180°, 90°, and 270°, thereby reducing an error according to values of amplitude A and brightness B, which linearly change.

FIG. 30 illustrates an example of the device 100 acquiring distance information in which an error generated due to a change of amplitude A is reduced, by using eight emitting lights in a repeated projection order of 0°, 180°, 90°, and 270°, according to an exemplary embodiment.

The device 100 according to an exemplary embodiment may acquire intensity images I2 through I9 by projecting the eight emitting lights in the repeated projection order of 0°, 180°, 90°, and 270°. Also, the linear function noise affects the intensity images I2 through I9 respectively by Δ, 2Δ, 3Δ, 4Δ, 5Δ, 6Δ, 7Δ, and 8Δ.

Here, the linear function noise may include noise of amplitude A and brightness B.

Accordingly, when MBI and ϕ are calculated by applying a weight of ⅛ to the intensity images I2 and I9, a weight of ⅜ to the intensity images I3 and I8, a weight of ⅝ to the intensity images I4 and I7, and a weight of ⅞ to the intensity images I5 and I6, an error caused by noise of amplitude A and brightness B in a form of a linear function is not generated both in MBI and ϕ, because simultaneity compensation is performed on time according to a weight based on a viewpoint between 0° and 180° at the center.

Thus, the device 100 may reduce or remove an error caused by the linear function noise by projecting the eight emitting lights in the repeated projection order of 0°, 180°, 90°, and 270° to acquire distance information. For example, when distance information is acquired as shown in FIG. 30, an error caused by linear function noise may be reduced compared to when four through seven emitting lights are used. As another example, when the distance information is acquired as shown in FIG. 30, an error caused by linear function noise may be reduced compared to when eight emitting lights are projected in a repeated projection order of 0°, 90°, 180°, and 270° to acquire distance information.

In detail, the device 100 acquires the distance information by projecting the eight emitting lights in the repeated projection order of 0°, 180°, 90°, and 270°, thereby reducing an error according to values of amplitude A and brightness B, which linearly change.

FIG. 31 illustrates an example of the device 100 acquiring distance information in which an error generated due to a change of amplitude A is reduced, by using eight emitting lights in a repeated projection order of 0°, 90°, 180°, and 270°, according to an exemplary embodiment.

Examples of equations indicating a value of I in FIG. 31 are shown at the bottom of FIG. 31.

The device 100 according to an exemplary embodiment may acquire intensity images I1 through I8 by projecting the eight emitting lights in the repeated projection order of 0°, 90°, 180°, and 270°. Also, the linear function noise affects the intensity images I1 through I8 respectively by 0, Δ, 2Δ, 3Δ, 4Δ, 5Δ, 6Δ, and 7Δ, and the quadratic function noise affects the intensity images I1 through I8 respectively by 0, a, 4a, 9a, 16a, 25a, 36a, and 49a.

Here, the linear function noise and the quadratic function noise include noise of amplitude A and brightness B.

Accordingly, when MBI and φ are calculated by applying a weight of ¼ to the intensity images I1, I2, I7, and I8 and a weight of ¾ to the intensity images I3, I4, I5, and I6, an error of 7a is generated in MBI due to the quadratic function noise and an error is generated in φ due to an effect of a change of amplitude A with respect to noise of amplitude A or brightness B in forms of a linear function and a quadratic function.

Thus, the device 100 may reduce or remove an error caused by linear function noise and quadratic function noise by projecting eight emitting lights in a repeated projection order of 0°, 90°, 180°, and 270° to acquire distance information. For example, when distance information is acquired as shown in FIG. 31, an error caused by linear function noise and quadratic function noise may be reduced compared to when four through seven emitting lights are used.

In detail, the device 100 acquires the distance information by projecting the eight emitting lights in the repeated projection order of 0°, 90°, 180°, and 270°, thereby reducing an error according to values of amplitude A and brightness B, which change linearly or in a form of a quadratic function.

FIG. 32 illustrates an example of the device 100 acquiring distance information in which an error generated due to a change of amplitude A is reduced, by using ten emitting lights in a repeated projection order of 0°, 180°, 90°, and 270°, according to an exemplary embodiment.

Examples of equations indicating a value of I in FIG. 32 are shown at the bottom of FIG. 32.

The device 100 according to an exemplary embodiment may acquire intensity images I2 through I11 by projecting the ten emitting lights in the repeated projection order of 0°, 180°, 90°, and 270°. Also, the linear function noise affects the intensity images I2 through I11 respectively by Δ, 2Δ, 3Δ, 4Δ, 5Δ, 6Δ, 7Δ, 8Δ, 9Δ, and 10Δ, and the quadratic function noise affects the intensity images I2 through I11 respectively by a, 4a, 9a, 16a, 25a, 36a, 49a, 64a, 81a, and 100a.

Here, the linear function noise and the quadratic function noise include noise of amplitude A and brightness B.

Accordingly, when MBI and φ are calculated by applying a weight of 1/16 to the intensity images I2 and I11, a weight of 3/16 to the intensity images of I3 and I10, a weight of 6/16 to the intensity images I4 and I9, a weight of 10/16 to the intensity images of I5 and I8, and a weight of 12/16 to the intensity images I6 and I7, an error caused by noise of amplitude A and brightness B in forms of a linear function and a quadratic function is not generated both in MBI and Δ, because simultaneity compensation is performed on time according to a weight based on a viewpoint between 180° and 90° at the center.

Thus, the device 100 may reduce or remove an error caused by linear function noise and quadratic function noise by projecting ten emitting lights in a repeated projection order of 0°, 180°, 90°, and 270° to acquire distance information. For example, when distance information is acquired as shown in FIG. 32, an error caused by linear function noise and quadratic function noise may be reduced compared to when four through nine emitting lights are used.

In detail, the device 100 acquires the distance information by projecting the ten emitting lights in the repeated projection order of 0°, 180°, 90°, and 270°, thereby reducing an error according to values of amplitude A and brightness B, which change linearly or in a form of a quadratic function.

The methods of applying a weight described above with reference to FIGS. 17 through 32 are only examples and do not limit the scope of the present disclosure. Any method of acquiring distance information about a subject by applying a weight to an intensity image, a reflected light, or a modulated reflected light according to a weight applying method pre-determined based on the number of emitting lights and/or a projection order of the emitting lights may be used. For example, a method of reducing an error caused by cubic function noise by projecting at least eleven emitting lights is within the scope of the present disclosure.

By controlling an emitting light being projected while a device acquires distance information about a subject, an error may be efficiently reduced.

The one or more exemplary embodiments may also be embodied as computer-readable codes on a non-transitory computer-readable recording medium to perform the above functions.

The computer-readable codes may further include a memory reference-related code about which a location (address number) of an internal or external memory of a computer is to be referenced for additional information or media required for a processor of the computer to perform the functions.

Examples of the non-transitory computer-readable recording medium include read-only memory (ROM), random-access memory (RAM), CD-ROMs, magnetic tapes, floppy disks, optical data storage devices, etc.

Examples of a computer capable of reading a recording medium having recorded thereon an application that is a program for executing one or more exemplary embodiments may include not only a general personal computer (PC), such as a desktop computer or a laptop computer, but also a mobile terminal, such as a smart phone, a tablet PC, a personal digital assistant (PDA), or a mobile communication terminal. However, the computer is not limited thereto, and may be any device capable of computing.

Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of acquiring information about a subject, the method comprising:

determining a number of a plurality of lights to be emitted to the subject;

determining an emission order of the plurality of lights so that a phase difference between two consecutive lights of the plurality of lights is to be twice as much as 360 degrees divided by the number of the plurality of lights;

emitting the determined number of the plurality of lights to the subject;

modulating the plurality of lights returning from the subject;

determining a weight based on the emission order and at least one of the plurality of lights emitted to the subject; and acquiring distance information about the subject by applying the weight to each of the modulated plurality of lights.

2. The method of claim 1, wherein the determining the number of the plurality of lights comprises determining the number of the plurality of lights to be one of 6 to 10 based on at least one of a type of noise to be filtered, the emission order, and an allowable error range.

3. The method of claim 2, wherein the type of noise comprises at least one of discontinuous noise generated irrespective of a lapse of time, linear function noise that linearly changes with the lapse of time, and quadratic function noise that changes in a form of a quadratic function with the lapse of time.

4. A method of acquiring information about a subject, the method comprising:

determining a number of a plurality of lights to be emitted to the subject;

emitting the determined number of the plurality of lights to the subject;

modulating the plurality of lights returning from the subject;

determining a weight based on at least one of the plurality of lights emitted to the subject and an emission order of the plurality of lights;

determining, from among a plurality of weight sets, a weight set indicating a weight corresponding to each of the modulated plurality of lights, according to at least one of the plurality of lights emitted to the subject and the emission order;

acquiring at least one of a phase difference according to time-of-flight (TOF) and a motion blur index (MBI) by applying the weight indicated by the determined weight set to each of the modulated plurality of lights; and acquiring distance information about the subject based on the at least one of the phase and the MBI.

5. The method of claim 1, wherein one of the plurality of lights emitted to the subject is one of a plurality of periodic waves, and periods of the plurality of periodic waves are equal to each other and at least one of amplitudes and phases of the plurality of periodic waves is different from each other.

6. The method of claim 1, wherein the acquiring the modulated plurality of lights comprises acquiring modulating the plurality of lights returning from the subject by using a modulating signal having a gain waveform.

7. The method of claim 6, wherein the modulating signal comprises a periodic wave having a same period as a periodic wave of the plurality of lights emitted to the subject.

8. The method of claim 1, wherein a phase difference of 90×N° exists between the plurality of lights emitted to the subject, wherein N is a natural number.

9. The method of claim 1, wherein the acquiring the distance information about the subject comprises acquiring a depth image comprising the distance information by using the determined number of the plurality of lights.

10. A device for acquiring information about a subject, the device comprising:

a processor configured to determine a number of a plurality of lights to be sequentially emitted onto the subject;

a light source configured to emit the determined number of the plurality of lights onto the subject; and a modulator configured to modulate the plurality of lights returning from the subject, wherein the processor is further configured to determine an emission order of the plurality of lights so that a phase difference between two consecutive lights of the plurality of lights is to be twice as much as 360 degrees divided by the number of the plurality of lights, and determine a weight based on the emission order and at least one of the plurality of lights emitted from the light source, and apply the weight to each of the modulated plurality of light to acquire distance information about the subject.

11. The device of claim 10, wherein the processor is further configured to determine the number of the plurality of lights to be one of 6 to 10 based on at least one of a type of noise to be filtered, the emission order, and an allowable error range.

12. The device of claim 11, wherein the type of noise comprises at least one of discontinuous noise generated irrespective of a lapse of time, linear function noise that linearly changes with the lapse of time, and quadratic function noise that changes in a form of a quadratic function with the lapse of time.

13. A device for acquiring information about a subject, the device comprising:

a processor configured to determine a number of a plurality of lights to be sequentially emitted onto the subject;

a light source configured to emit the determined number of the plurality of lights onto the subject; and a modulator configured to modulate the plurality of lights returning from the subject, wherein the processor is further configured to determine a weight based on at least one of the plurality of lights emitted from the light source and an emission order in which the light source emits the plurality of lights, acquire at least one of a phase difference according to time-of-flight (TOF) and a motion blur index (MBI) by applying the weight to each of the modulated plurality of lights, and acquire distance information about the subject based on the at least one of the phase and the MBI.

14. The device of claim 10, wherein one of the plurality of lights emitted from the light source is one of four types of periodic waves, and periods of the periodic waves are equal to each other and at least one of amplitudes and phases of the periodic waves is different from each other.

15. The device of claim 10, wherein the modulator is further configured to modulate the plurality of lights returning from the subject by using a modulating signal having a gain waveform.

16. The device of claim 15, wherein the modulating signal comprises a periodic wave having a same period as a periodic wave of the plurality of lights emitted from the light source.

17. The device of claim 10, wherein a phase difference of 90×N° exists between the plurality of lights emitted from the light source, wherein N is a natural number.

18. A non-transitory computer-readable recording medium that stores a computer program executable by a computer to perform the method of claim 1.

19. A method of acquiring depth information of a subject, the method comprising:
   emitting a plurality of lights to the subject;
   receiving the plurality of lights returning from the subject;
   determining a motion blur index (MBI) of an image that is obtained based on the plurality of lights returning from the subject;
   increasing a number of the plurality of lights to be emitted to the subject in response to the MBI being greater than a predetermined value; and
   acquiring the depth information of the subject based on the increased number of the plurality of lights in response to the MBI being greater than the predetermined value.

20. The method of claim 19, wherein phases of the plurality of lights are different from each other, and the plurality of lights are emitted to the subject in a first order, and
   wherein the method further comprises changing an order in which the plurality of lights are emitted from the first order to a second order in response to the MBI being greater than the predetermined value.

* * * * *